(12) United States Patent
Suzuki et al.

(10) Patent No.: US 11,778,347 B2
(45) Date of Patent: Oct. 3, 2023

(54) PHOTOELECTRIC CONVERSION DEVICE

(71) Applicant: CANON KABUSHIKI KAISHA, Tokyo (JP)

(72) Inventors: Satoshi Suzuki, Kanagawa (JP); Shintaro Takenaka, Kanagawa (JP); Taichi Kasugai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/930,262

(22) Filed: Sep. 7, 2022

(65) Prior Publication Data

US 2023/0077775 A1    Mar. 16, 2023

(30) Foreign Application Priority Data

Sep. 14, 2021   (JP) ................. 2021-149169

(51) Int. Cl.
| | | |
|---|---|---|
| *H04N 25/621* | (2023.01) | |
| *H04N 23/84* | (2023.01) | |
| *H04N 25/50* | (2023.01) | |
| *H04N 25/75* | (2023.01) | |

(52) U.S. Cl.
CPC ........... *H04N 25/621* (2023.01); *H04N 23/84* (2023.01); *H04N 25/50* (2023.01); *H04N 25/75* (2023.01)

(58) Field of Classification Search
None
See application file for complete search history.

(56) References Cited

U.S. PATENT DOCUMENTS

| | | |
|---|---|---|
| 7,999,866 B2 | 8/2011 | Sonoda |
| 8,009,213 B2 | 8/2011 | Okita |
| 8,049,799 B2 | 11/2011 | Sonoda et al. |
| 8,081,246 B2 | 12/2011 | Takenaka |
| 8,158,920 B2 | 4/2012 | Suzuki |
| 8,159,573 B2 | 4/2012 | Suzuki |
| 8,278,613 B2 | 10/2012 | Okita |
| 8,305,473 B2 | 11/2012 | Takenaka |
| 8,363,137 B2 | 1/2013 | Sonoda |
| 8,427,567 B2 | 4/2013 | Okita |
| 8,466,994 B2 | 6/2013 | Takenaka |

(Continued)

FOREIGN PATENT DOCUMENTS

| | | |
|---|---|---|
| JP | 2006-304166 A | 11/2006 |
| JP | 2009-296276 A | 12/2009 |

(Continued)

*Primary Examiner* — Mark T Monk
(74) *Attorney, Agent, or Firm* — VENABLE LLP

(57) ABSTRACT

A photoelectric conversion device includes a plurality of unit pixels each including a charge holding portion to which charges are transferred from four or more photoelectric conversion units. Sensitivity of each photoelectric conversion unit of a first group to incident light is greater than sensitivity of each photoelectric conversion unit of a second group to the incident light. After charge accumulation is started in all the photoelectric conversion units of the second group, charge accumulation is started in the photoelectric conversion units of the first group. After signals corresponding to charges accumulated in all the photoelectric conversion units of the second group are read out, signals corresponding to charges accumulated in the photoelectric conversion units of the first group are read out.

11 Claims, 16 Drawing Sheets

(56) References Cited

U.S. PATENT DOCUMENTS

| | | | |
|---|---|---|---|
| 8,670,058 B2 | 3/2014 | Hayashi | |
| 9,654,697 B2 | 5/2017 | Takenaka | |
| 9,812,473 B2 | 11/2017 | Miyamoto | |
| 9,843,752 B2 | 12/2017 | Yamamoto | |
| 10,277,839 B2 | 4/2019 | Takenaka | |
| 10,356,314 B2 | 7/2019 | Suzuki | |
| 10,547,794 B2 | 1/2020 | Takenaka | |
| 10,645,316 B2 | 5/2020 | Shigiya | |
| 10,750,103 B2 | 8/2020 | Takenaka | |
| 11,202,023 B2 | 12/2021 | Shigiya | |
| 11,303,829 B2 | 4/2022 | Shigiya | |
| 11,425,325 B2 | 8/2022 | Kasagai | |
| 11,490,041 B2 | 11/2022 | Shigiya | |
| 2011/0267513 A1 | 11/2011 | Sonoda | |
| 2012/0013778 A1 | 1/2012 | Sonoda | |
| 2015/0129744 A1 | 5/2015 | Sonoda | |
| 2016/0173793 A1* | 6/2016 | Mitsunaga | H04N 25/583 348/229.1 |
| 2017/0163914 A1 | 6/2017 | Hara | |
| 2020/0213564 A1 | 7/2020 | Onishi | |
| 2021/0176421 A1 | 6/2021 | Shikina | |
| 2022/0353450 A1 | 11/2022 | Kasugai | |

FOREIGN PATENT DOCUMENTS

| | | |
|---|---|---|
| JP | 2013-118698 A | 6/2013 |
| JP | 2020-108061 A | 7/2020 |
| WO | 2016/027397 A1 | 2/2016 |

* cited by examiner

PHOTOELECTRIC CONVERSION DEVICE

BACKGROUND OF THE INVENTION

Field of the Invention

The present invention relates to a photoelectric conversion device.

Description of the Related Art

Japanese Patent Application Laid-Open No. 2013-118698 discloses a CMOS image sensor including a pixel in which one floating diffusion is shared by a plurality of photodiodes.

Japanese Patent Application Laid-Open No. 2020-108061 discloses an imaging device in which color filters that transmit light having specific wavelength components are arranged in a predetermined pattern on a pixel region in order to obtain a color image. The imaging device disclosed in Japanese Patent Application Laid-Open No. 2020-108061 employs an arrangement RGBW including a white (W) color filter (white filter) that transmits light in the entire wavelength region of visible light in addition to three color filters of red (R), green (G), and blue (B). Japanese Patent Application Laid-Open No. 2020-108061 also discloses a configuration in which one floating diffusion is shared by a plurality of photodiodes.

In the photoelectric conversion device described in Japanese Patent Application Laid-Open No. 2013-118698 or Japanese Patent Application Laid-Open No. 2020-108061, blooming may occur due to an overflow of charges generated in one pixel to another pixel depending on conditions such as an amount of incident light. In a pixel in which blooming occurs, a signal proportional to the accumulation time cannot be obtained. Therefore, blooming may lower the signal acquisition accuracy of the photoelectric conversion device.

SUMMARY OF THE INVENTION

An object of the present invention is to provide a photoelectric conversion device capable of reducing blooming.

According to an aspect of the present invention, there are provided a photoelectric conversion device including a plurality of unit pixels. Each of the plurality of unit pixels including four or more photoelectric conversion units each configured to generate charges corresponding to incident light, a charge holding portion to which charges are transferred from the four or more photoelectric conversion units, charge transfer units arranged corresponding to the four or more photoelectric conversion units and each configured to transfer charges from corresponding photoelectric conversion unit to the charge holding portion, and an output unit configured to output a signal corresponding to charges held by the charge holding portion. The four or more photoelectric conversion units are divided into a first group including a plurality of photoelectric conversion units and a second group including a plurality of photoelectric conversion units. Sensitivity of each photoelectric conversion unit of the first group to the incident light is greater than sensitivity of each photoelectric conversion unit of the second group to the incident light. After charge accumulation is started in all the photoelectric conversion units of the second group, charge accumulation is started in the photoelectric conversion units of the first group. After signals corresponding to charges accumulated in all the photoelectric conversion units of the second group are read out, signals corresponding to charges accumulated in the photoelectric conversion units of the first group are read out.

Further features of the present invention will become apparent from the following description of exemplary embodiments with reference to the attached drawings.

DESCRIPTION OF THE EMBODIMENTS

First Embodiment

Figure 1:
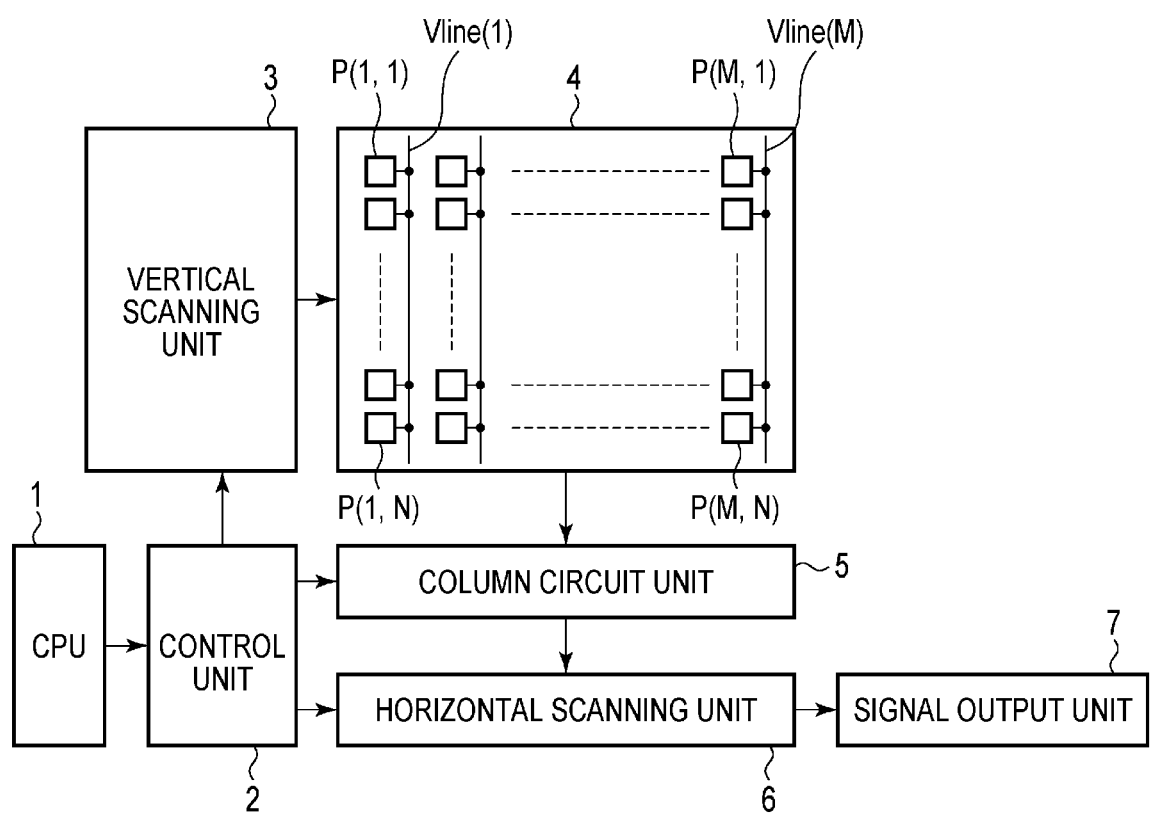
FIG. 1 is a block diagram illustrating a schematic configuration of a photoelectric conversion device according to a first embodiment.

Preferred embodiments of the present invention will now be described in detail in accordance with the accompanying drawings. In the drawings, the same or corresponding elements are denoted by the same reference numerals, and the description thereof may be omitted or simplified. In each of the embodiments described below, an imaging device will be mainly described as an example of a photoelectric conversion device. However, the photoelectric conversion device of each embodiment is not limited to the imaging device, and can be applied to other devices. Examples of other devices include a ranging device and a photometry device.

The ranging device may be, for example, a focus detection device, a distance measuring device using a time-of-flight (TOF), or the like. The photometric device may be a device for measuring an amount of light incident on the device.

FIG. 1 is a block diagram illustrating a schematic configuration of a photoelectric conversion device according to the present embodiment. The photoelectric conversion device includes a central processing unit (CPU) 1, a control unit 2, a vertical scanning unit 3, a pixel array 4, a column circuit unit 5, a horizontal scanning unit 6, and a signal output unit 7. Note that various circuits constituting the photoelectric conversion device may be formed in one or a plurality of semiconductor substrates.

The CPU 1 is a processor that controls the photoelectric conversion device by executing a program. The CPU 1 may be provided in the photoelectric conversion device, or may be provided in a photoelectric conversion system in which the photoelectric conversion device is mounted, that is, outside the photoelectric conversion device.

The control unit 2 is a control circuit that receives a control signal such as a synchronization signal output from the CPU 1 and a setting signal indicating an operation mode, and supplies control signals to the vertical scanning unit 3, the column circuit unit 5, and the horizontal scanning unit 6.

The vertical scanning unit 3 is a scanning circuit including a shift register, a gate circuit, a buffer circuit, and the like. The vertical scanning unit 3 receives control signals such as a vertical synchronization signal, a horizontal synchronization signal, and a clock signal from the control unit 2, and performs reset scanning and read scanning of the pixel array 4. The reset scanning is an operation in which exposure is started by sequentially releasing a reset state of the photoelectric conversion unit and setting a charge accumulation state for the pixels in a part or all of the rows of the pixel array 4. The read scanning is an operation of sequentially outputting signals based on charges accumulated in the photoelectric conversion unit to pixels in a part or all of the rows of the pixel array 4. The vertical scanning unit 3 corresponds to a driving device that outputs a driving signal for driving the pixel array 4 on a row basis to the pixel array 4.

The pixel array 4 includes a plurality of unit pixels P(1, 1) to P(M, N) of N rows and M columns arranged to form a plurality of rows and a plurality of columns, and a plurality of vertical output lines Vline(1) to Vline(M) of M columns. Here, the row direction indicates a horizontal direction in the drawing, and the column direction indicates a vertical direction in the drawing. In addition, indices in parentheses of the unit pixel P(M, N) sequentially indicate the column number and the row number. The row number of the uppermost row in FIG. 1 is one, and the column number of the leftmost row in FIG. 1 is one. When it is not necessary to indicate the column number and the row number, indices indicating the column number and the row number may be omitted.

The column circuit unit 5 includes an amplifier circuit, an analog-to-digital conversion (Hereinafter, it is referred to as "AD conversion".) circuit, and a column memory. These circuits are arranged corresponding to the vertical output lines Vline(1) to Vline(m). The column circuit unit 5 amplifies a signal read from the pixel array 4, performs AD conversion, and holds the converted signal in the column memory as a digital signal. The horizontal scanning unit 6 is a scanning circuit including a shift register, a gate circuit, a buffer circuit, and the like. The horizontal scanning unit 6 sequentially scans the signals held in the memory of the column circuit unit 5 and outputs the signals to the signal output unit 7 in response to a control signal from the control unit 2.

The signal output unit 7 includes a digital processing unit, a parallel-to-serial conversion circuit, and an output circuit such as low voltage differential signaling (LVDS). The signal output unit 7 digitally processes the signal output from the horizontal scanning unit 6 and outputs the processed signal as serial data to the outside of the photoelectric conversion device.

Note that it is not essential that the column circuit unit 5 has the AD conversion function, and for example, the configuration may be modified such that the AD conversion is performed outside the photoelectric conversion device. In this case, the configurations of the horizontal scanning unit 6 and the signal output unit 7 are appropriately modified so as to be compatible with the processing of an analog signal.

Figure 2:
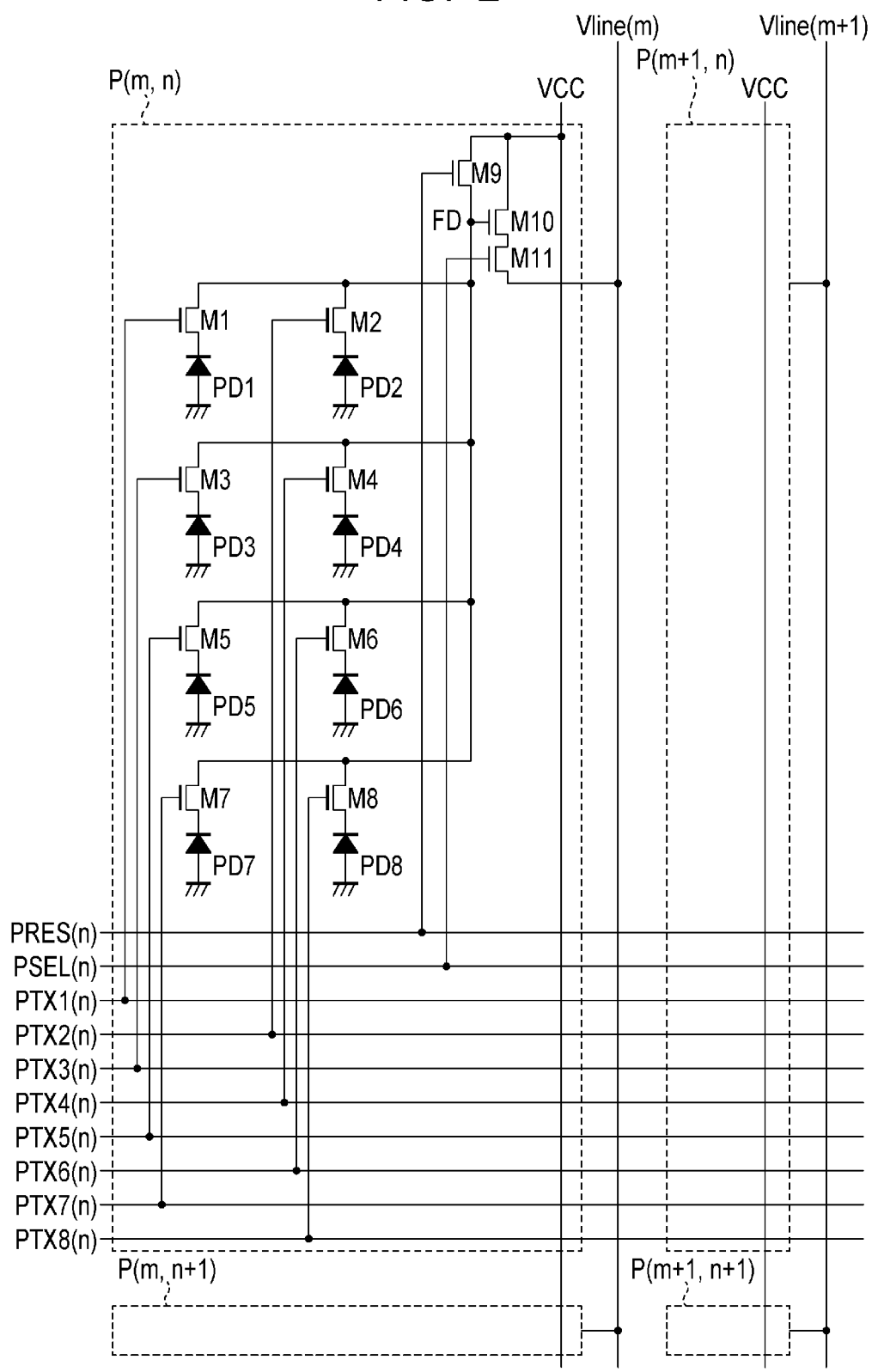
FIG. 2 is a circuit diagram of a unit pixel according to the first embodiment.

FIG. 2 is a circuit diagram of the unit pixels P included in the pixel array 4 according to the present embodiment. FIG. 2 schematically illustrates the unit pixels P on the two rows and two columns of n-th row and the (n+1)-th row and the m-th column and the (m+1)-th column. In FIG. 2, the unit pixel P(m, n) is arranged at the n-th row and m-th column of the pixel array 4. Each unit pixel P includes photoelectric conversion units PD1 to PD8, a floating diffusion FD, transfer transistors M1 to M8, a reset transistor M9, an amplification transistor M10, and a selection transistor M11. The unit pixel P is an FD sharing pixel in which eight photoelectric conversion units PD1 to PD8 share one floating diffusion FD.

Each of the photoelectric conversion units PD1 to PD8 is a photoelectric conversion element that photoelectrically converts incident light to generate and accumulate charges corresponding to the incident light. Each of the photoelectric conversion units PD1 to PD8 is, for example, a photodiode. The anodes of the photodiodes constituting the photoelectric conversion units PD1 to PD8 are connected to nodes of a ground potential. The cathodes of the photodiodes constituting the photoelectric conversion units PD1 to PD8 are connected to the sources of the transfer transistors M1 to M8, respectively.

The drains of the transfer transistors M1 to M8 are connected to the floating diffusion FD which is a connection node between the source of the reset transistor M9 and the gate of the amplification transistor M10. The drain of the reset transistor M9 and the drain of the amplification transistor M10 are electrically connected to a power supply line having a pixel power supply potential VCC. The source of the amplification transistor M10 is connected to the drain of the selection transistor M11. The source of the selection transistor M11 is electrically connected to a current source (not illustrated) via a vertical output line Vline(m). Thus, the amplification transistor M10 and the current source operate as a source follower circuit. That is, the amplification transistor M10 functions as an output unit capable of outputting a signal corresponding to the potential of the floating diffusion FD to the vertical output line Vline(m). The floating diffusion FD includes a capacitance component (floating diffusion capacitance), and functions as a charge holding portion by this capacitance component.

Control signals PTX1($n$) to PTX8($n$) are input from the vertical scanning unit 3 to gates of the transfer transistors M1 to M8, respectively. The transfer transistors M1 to M8 transfer charges accumulated in the photoelectric conversion units PD1 to PD8 to the floating diffusion FD based on the control signals PTX1($n$) to PTX8($n$), respectively. That is, each of the transfer transistors M1 to M8 functions as a charge transfer unit. The floating diffusion FD holds the transferred charges.

A control signal PRES(n) is input from the vertical scanning unit 3 to the gate of the reset transistor M9. The reset transistor M9 resets the potential of the floating diffusion FD to a predetermined potential based on the control signal PRES(n).

A control signal PSEL(n) is input from the vertical scanning unit 3 to the gate of the selection transistor M11. The control signal PSEL(n) is a signal for selecting a row to output a signal, and the selection transistor M11 is controlled to be a connective state or a non-connective state based on the control signal PSEL(n). The index n of each control signal indicates the row number of the corresponding row.

Each transistor is controlled to be the conductive state when a control signal input to the gate is at the high level and controlled to be the non-conductive state when the control signal is at the low level. It is assumed that the high level corresponds to the logical value "1" and the low level corresponds to the logical value "0".

When the transfer transistors M1 to M8 are in the non-conductive state, the photoelectric conversion units PD1 to PD8 are in an accumulation state in which charges generated by photoelectric conversion are accumulated. When the transfer transistors M1 to M8 are in the conductive state and the reset transistor M9 is in the conductive state, the photoelectric conversion units PD1 to PD8 are in a non-accumulation state in which charges are not accumulated, that is, in a reset state. When any one of the transfer transistors M1 to M8 is in the conductive state and the reset transistor M9 is in the non-conductive state, the unit pixel P(m, n) is in a reading state in which charges of the photoelectric conversion units PD1 to PD8 can be transferred to the floating diffusion FD and read. The reset of the photoelectric conversion units PD1 to PD8 may be controlled by a discharging transistor configured to electrically connect the cathodes of the photoelectric conversion units PD1 to PD8 to a power supply line having a power supply potential.

In the present embodiment, each transistor is an N-channel MOS transistor, but may be a P-channel MOS transistor. In this case, the level or the like of each control signal may be changed as appropriate.

Figure 3A:
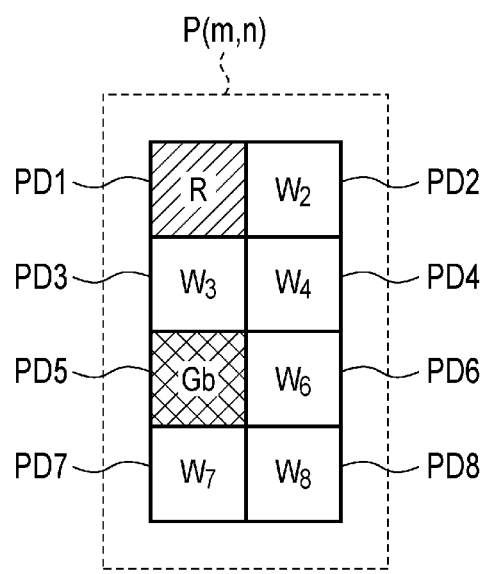
FIGS. 3A, 3B, and 3C are schematic diagrams illustrating arrangements of color filters according to the first embodiment.
Figure 3B:
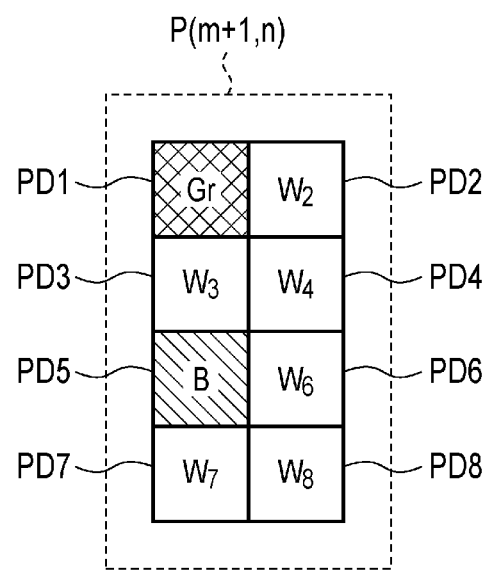
Figure 3C:
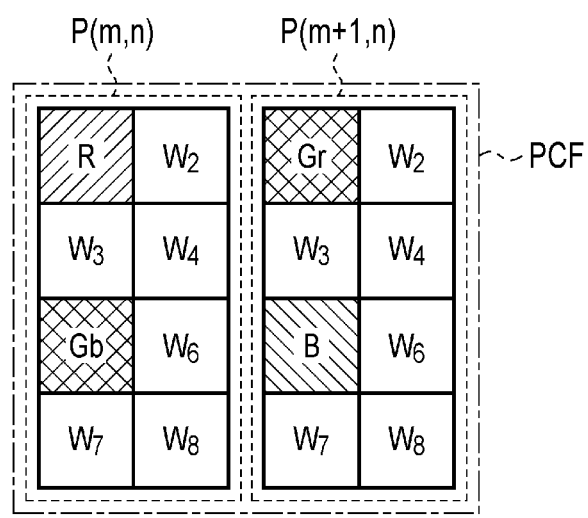

Next, arrangements of color filters in the unit pixel P according to the present embodiment will be described with reference to FIGS. 3A, 3B, and 3C. FIGS. 3A, 3B, and 3C are schematic views illustrating arrangements of color filters according to the present embodiment. FIG. 3A is a schematic diagram illustrating an arrangement of color filters in the unit pixel P(m, n) (first unit pixel) according to the present embodiment. One of red (R), green (G), and white (W) color filters is arranged on the optical path of the incident light to the photoelectric conversion units PD1 to PD8 of the unit pixel P(m, n). The red (R) color filter mainly transmits light in a red wavelength region. The green (G) color filter mainly transmits light in a green wavelength region. The white (W) color filter transmits light in the entire wavelength region of visible light.

The red (R) color filter is disposed on the photoelectric conversion unit PD1. The photoelectric conversion unit PD1 may be referred to as a pixel R. The green (G) color filter is disposed on the photoelectric conversion unit PD5. The photoelectric conversion unit PD5 may be referred to as a pixel G (pixel Gb). The white (W) color filters are disposed on the photoelectric conversion units PD2, PD3, PD4, PD6, PD7, and PD8. The photoelectric conversion units PD2, PD3, PD4, PD6, PD7, and PD8 may be referred to as pixel $W_2$, pixel $W_3$, pixel $W_4$, pixel $W_6$, pixel $W_7$, and pixel $W_8$, respectively. Note that the pixel $W_2$, the pixel $W_3$, the pixel $W_4$, the pixel $W_6$, the pixel $W_7$, and the pixel $W_8$ are denoted by indices corresponding to the numbers of the photoelectric conversion units for the purpose of distinction, but they may be collectively referred to as pixels W.

FIG. 3B is a schematic diagram illustrating an arrangement of color filters in the unit pixel P(m+1, n) (second unit pixel) according to the present embodiment. One of color filters of green (G), blue (B), and white (W) is disposed on the optical path of the incident light to the photoelectric conversion units PD1 to PD8 of the unit pixel P(m+1, n). The blue (B) color filter mainly transmits light in the blue wavelength region.

The green (G) color filter is disposed on the photoelectric conversion unit PD1. The photoelectric conversion unit PD1 may be referred to as a pixel G (pixel Gr). The blue (B) color filter is disposed on the photoelectric conversion unit PD5. The photoelectric conversion unit PD5 may be referred to as a pixel B. The other points are the same as those of the unit pixel P(m, n). When it is necessary to distinguish between the pixel G included in the unit pixel P(m, n) and the pixel G included in the unit pixel P(m+1, n), they are referred to as a pixel and Gb a pixel Gr, respectively.

FIG. 3C is a schematic diagram illustrating an arrangement of color filters in a CF unit pixel according to the present embodiment. The arrangement of the color filters in the pixel array 4 of the present embodiment is obtained by combining the arrangement of the two unit pixels illustrated in FIGS. 3A and 3B. That is, as illustrated in FIG. 3C, two unit pixels P of the unit pixel P(m, n) and the unit pixel P(m+1, n) constitute one unit of a pixel (CF unit pixel PCF) in a color filter basis. The sixteen pixels illustrated in FIG. 3C include one pixel R, one pixel B, one pixel Gr, one pixel Gb, and twelve pixels W. A pixel array of these sixteen pixels is referred to as a pixel arrangement RGBW12. The positions of the pixel R, the pixel B, and the pixel G are examples. The number of pixels arranged may be increased or decreased, or the arrangement of pixels may be modified.

The sensitivity of the pixel W is higher than the sensitivity of the pixel R, the pixel G, and the pixel B due to a difference in the light transmission bandwidth of the color filter or the like. That is, in the present embodiment, the plurality of photoelectric conversion units is divided into a first group (pixel W) including a plurality of photoelectric conversion units having relatively high sensitivity and a second group (pixel R, pixel G, and pixel B) including a plurality of photoelectric conversion units having relatively low sensitivity. In the present embodiment, in the pixel arrangement RGBW12, the reset scanning and the read scanning of each pixel are performed in an order in which the above-described sensitivity difference is considered. Hereinafter, the reset scanning and the read scanning of the present embodiment will be described.

Figure 4:
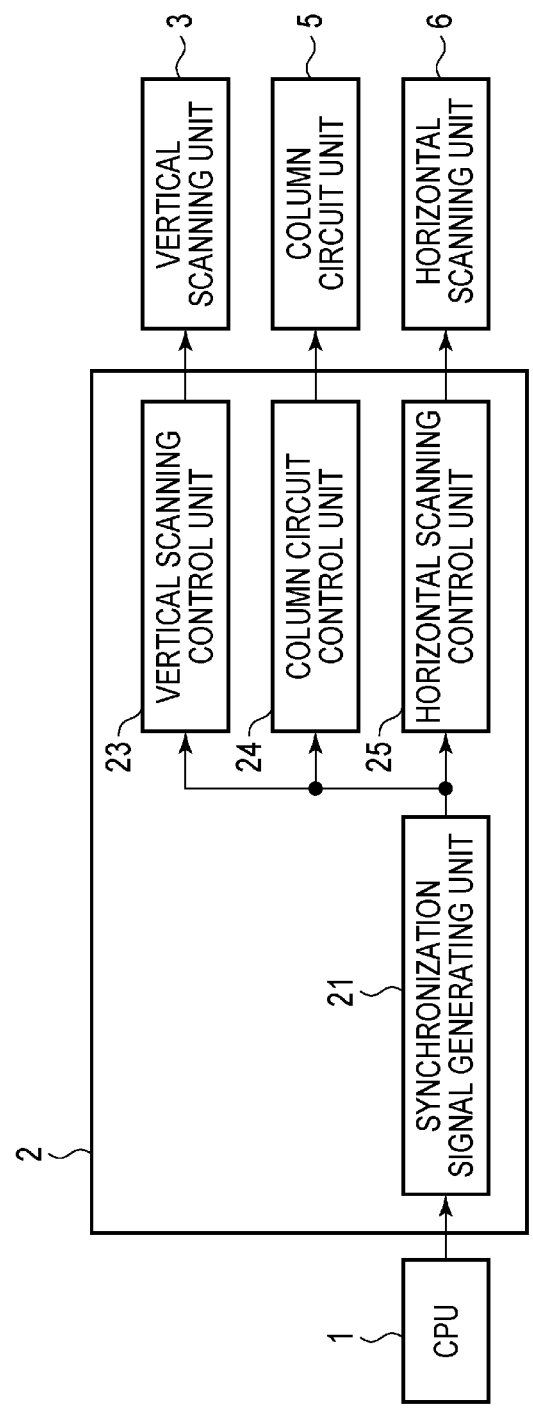
FIG. 4 is a block diagram illustrating a configuration of a control unit according to the first embodiment.

FIG. 4 is a block diagram illustrating a configuration of the control unit 2 according to the present embodiment. The control unit 2 includes a synchronization signal generating unit 21, a vertical scanning control unit 23, a column circuit control unit 24, and a horizontal scanning control unit 25.

The synchronization signal generating unit 21 generates a vertical synchronization signal and a horizontal synchronization signal used for controlling the operation timings of the respective units for read scanning and reset scanning in accordance with the control of the CPU 1.

The vertical scanning control unit 23 generates a control signal for controlling the driving of the vertical scanning unit 3, and outputs the control signal to the vertical scanning unit 3. The vertical scanning unit 3 outputs the control signal RES, the control signal SEL, and the control signals TX1 to TX8 in accordance with a control signal from the vertical scanning control unit 23. In some cases, indices indicating row numbers are added to these control signals. Hereinafter, the control signals output from the vertical scanning unit 3 are generically referred to as pixel driving pulses.

The column circuit control unit 24 generates a control signal for controlling the driving of the column circuit unit 5, and outputs the control signal to the column circuit unit 5. The horizontal scanning control unit 25 generates a control signal for controlling the driving of the horizontal scanning unit 6 and outputs the control signal to the horizontal scanning unit 6.

Figure 5:
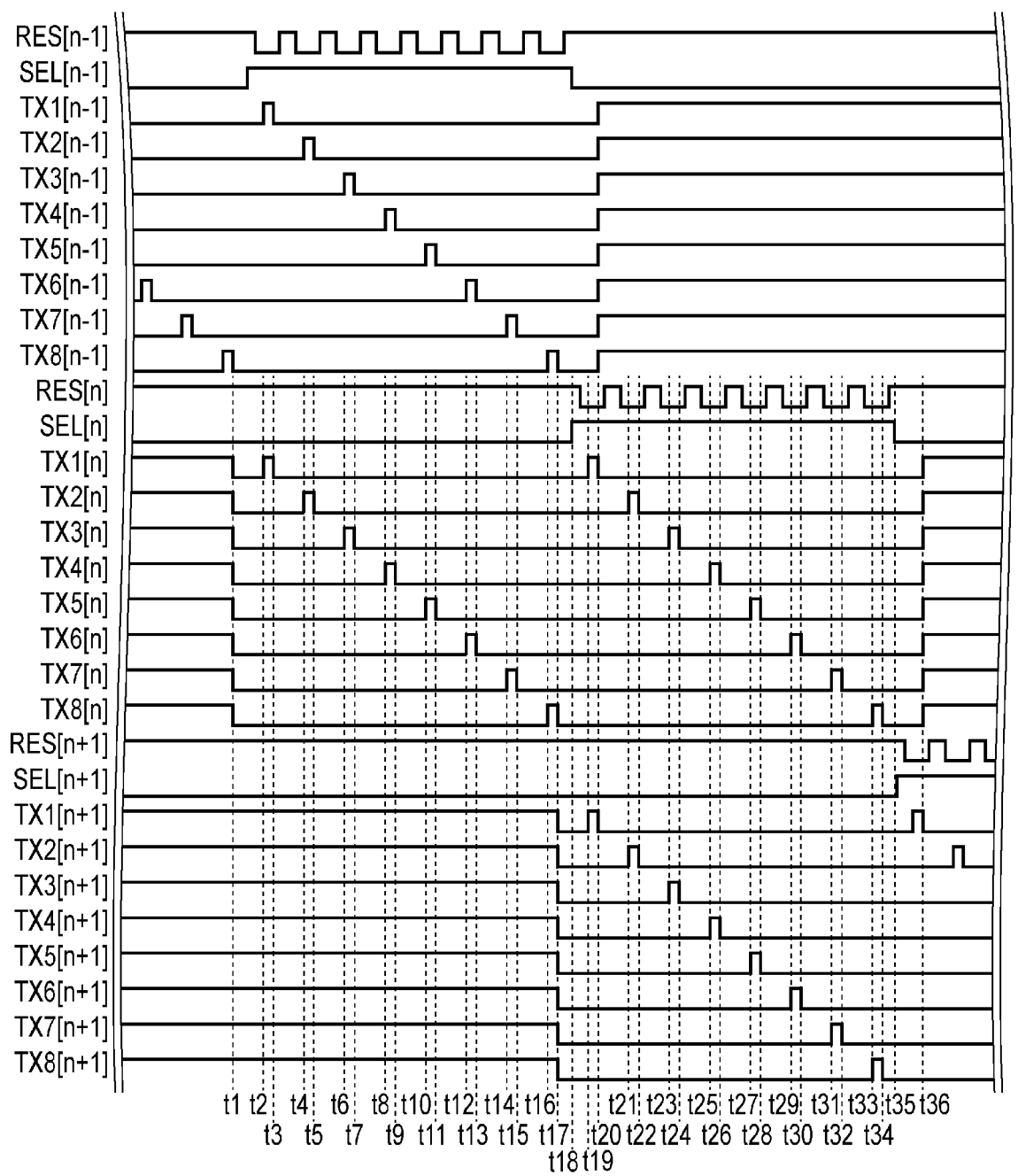
FIG. 5 is a timing chart of control signals output from a vertical scanning unit according to the first embodiment.

Next, the pixel driving pulses output from the vertical scanning unit 3 will be described with reference to FIG. 5. FIG. 5 is a timing chart of control signals output from the vertical scanning unit 3 according to the present embodiment. FIG. 5 illustrates timings of pixel driving pulses corresponding to unit pixels P on three rows including the (n−1)-th row, the n-th row, and the (n+1)-th row. Since the timings of the pixel driving pulses of the (n−1)-th row and the (n+1)-th row are shifted in the time direction with respect to the timings of the n-th row, the pixel driving pulses of the n-th row will be described below, and the description of the other rows will be omitted.

In a period before time t1, the control signal RES[n] and the control signals TX1[n] to TX8[n] are maintained at the high level. Thereby, the photoelectric conversion units PD1 to PD8 are maintained in the reset state. Further, the control signal SEL[n] is maintained at the low level, and the selection transistor M11 is in the non-conductive state.

At the time t1, the control signals TX1[n] to TX8[n] transition to the low level. Thus, the reset state of the photoelectric conversion units PD1 to PD8 is released.

At time t2, the control signal TX1[n] transitions to the high level, and the photoelectric conversion unit to which the control signal TX1[n] is input is temporarily reset. Then, at time t3, the control signal TX1[n] transitions to the low level. By these operations, charge accumulation is started in the photoelectric conversion unit to which the control signal TX1[n] is input.

At time t4, the control signal TX2[n] transitions to the high level, and the photoelectric conversion unit to which the control signal TX2[n] is input is temporarily reset. Then, at time t5, the control signal TX2[n] transitions to the low level. By these operations, charge accumulation is started in the photoelectric conversion unit to which the control signal TX2[n] is input.

In the period from the time t6 to the time t17, similarly, pulses of the control signals TX3[n] to TX8[n] are output, and accumulation of the photoelectric conversion units is sequentially started. A series of operations from the time t2 to the time t17 is referred to as reset scanning of the n-th row.

Further, the length of the period from the time t17 immediately after the reset scanning of the n-th row to time t18 at which the next operation starts can be appropriately set. By adjusting the length of this period, the accumulation time of charges in the photoelectric conversion units PD1 to PD8 can be controlled. The length of this period is set, for example, by a control signal from the CPU 1. FIG. 5 illustrates a case where the length of the period from the time t17 to the time t18 is substantially shortest.

At the time t18, the control signal SEL[n] transitions to the high level, and the selection transistor M11 is turned on. Thus, the amplification transistor M10 of the unit pixel P(m, n) and the vertical output line Vline(m) are electrically connected to each other through the selection transistor M11. By this operation, a signal based on the potential of the floating diffusion FD can be output to the vertical output line Vline(m) of the m-th column.

At a time between the time t18 and time t19, the control signal RES[n] transitions to the low level. Thereby, the reset state of the floating diffusion FD is released.

After the reset of the floating diffusion FD is released, the control signal TX1[n] transitions to the high level at the time t19. By this operation, the charge accumulated in the photoelectric conversion unit to which the control signal TX1[n] is input is transferred to the floating diffusion FD. A signal corresponding to the potential of the floating diffusion FD is output to the vertical output line Vline(m) of the m-th column. The signal output to the vertical output line Vline(m) is amplified and A/D converted by the column circuit unit 5, and is held in the column memory as a digital signal.

Then, at time t20, the control signal TX1[n] transitions to the low level. Thus, the transfer operation of the charges accumulated in the photoelectric conversion unit is completed. That is, the period from the time t3 to the time t20 corresponds to the charge accumulation period in the photoelectric conversion unit.

At a time between the time t20 and time t21, the control signal RES[n] transitions to the high level, and after a predetermined time period, the control signal RES[n] transitions to the low level again. By this operation, the potential of the floating diffusion FD is reset.

At the time t21, the control signal TX2[n] transitions to the high level, and the same transfer operation as at the time t19 starts. Then, at time t22, the control signal TX2[n] transitions to the low level, and the charge transfer operation accumulated in the photoelectric conversion unit is completed.

In the period from time t23 to time t34, similarly, pulses of the control signals TX3[n] to TX8[n] are output, and the transfer operation from each photoelectric conversion unit to the floating diffusion FD is sequentially performed. A series of operations from the time t19 to the time t34 is referred to as read scanning of the n-th row.

At time t35, the control signal SEL[n] transitions to the low level, and the selection transistor M11 becomes the non-conductive state. Thereby, the amplification transistor M10 of the unit pixel P and the vertical output line Vline(m) are electrically disconnected.

At time t36, the control signals TX1[n] to TX8[n] transit to the high level. Thus, the photoelectric conversion units PD1 to PD8 enter the reset state. As described above, a series of operations from the start of charge accumulation in the unit pixel P of the n-th row to the end of the read scanning of the n-th row is completed.

Figure 6:
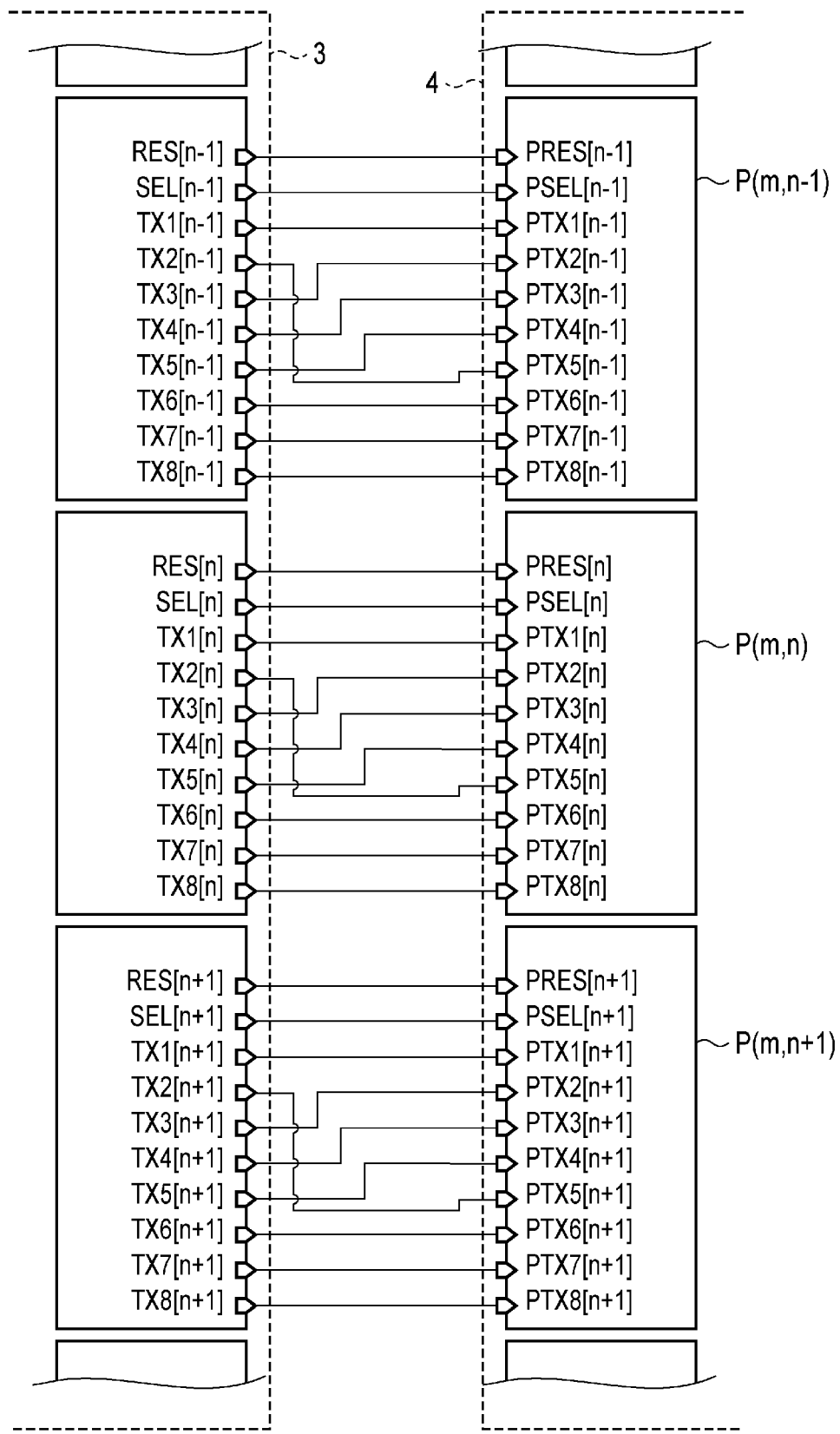
FIG. 6 is a schematic diagram illustrating connections between a vertical scanning unit and a pixel array according to the first embodiment.

Next, a connection relationship between the vertical scanning unit 3 and the pixel array 4 will be described with reference to FIG. 6. FIG. 6 is a schematic diagram illustrating a connection between the vertical scanning unit 3 and the pixel array 4 according to the present embodiment. FIG. 6 illustrates a connection relationship between the output terminals of the vertical scanning unit 3 and the input terminals of the pixel array 4 according to the first embodiment. Terminals from which the control signals RES, SEL, and TX1 to TX8 are output from the vertical scanning unit 3 are referred to as output terminals RES, SEL, and TX1 to TX8, respectively. Terminals at which the control signals PRES, PSEL, and PTX1 to PTX8 illustrated in FIG. 2 are input to the pixel array 4 are referred to as input terminals PRES, PSEL, and PTX1 to PTX8, respectively. In some cases, an index indicating a row number is attached to a reference numeral of each of the output terminals and the input terminals.

The connection relationship between the output terminals of the vertical scanning unit 3 and the input terminals of the pixel array 4 is the same for each row. Therefore, only the connection relationship between the output terminals RES[n], SEL[n], TX1[n] to TX8[n] of the vertical scanning unit 3 corresponding to the unit pixels P(m, n) of the n-th row and the input terminals PRES[n], PSEL[n], and PTX1[n] to PTX8[n] of the pixel array 4 will be described.

The output terminal RES[n] of the vertical scanning unit 3 is connected to the input terminal PRES[n] of the pixel array 4. The output terminal SEL[n] of the vertical scanning unit 3 is connected to the input terminal PSEL[n] of the pixel array 4. The output terminals TX1[n], TX6[n], TX7[n], and TX8[n] of the vertical scanning unit 3 are connected to the input terminals PTX1[n], PTX6[n], PTX7[n], and PTX8[n] of the pixel array 4, respectively.

The output terminal TX2[n] of the vertical scanning unit 3 is connected to the input terminal PTX5[n] of the pixel array 4. The output terminal TX3[n] of the vertical scanning unit 3 is connected to the input terminal PTX2[n] of the pixel array 4. The output terminal TX4[n] of the vertical scanning unit 3 is connected to the input terminal PTX3[n] of the pixel array 4. The output terminal TX5[n] of the vertical scanning unit 3 is connected to the input terminal PTX4[n] of the pixel array 4. In this way, the control signals TX2[n] to TX5[n] output from the vertical scanning unit 3 are input to the pixel array 4 as control signals PTX2[n] to PTX5[n] of different indices.

As described above, in the present embodiment, the output terminals of the vertical scanning unit 3 and the input terminals of the pixel array 4 are connected by the wiring. By appropriately setting the connection relationship of the wirings, the driving order of the control signals PTX1[n] to PTX8[n] can be set.

Figures 7A, 7B:
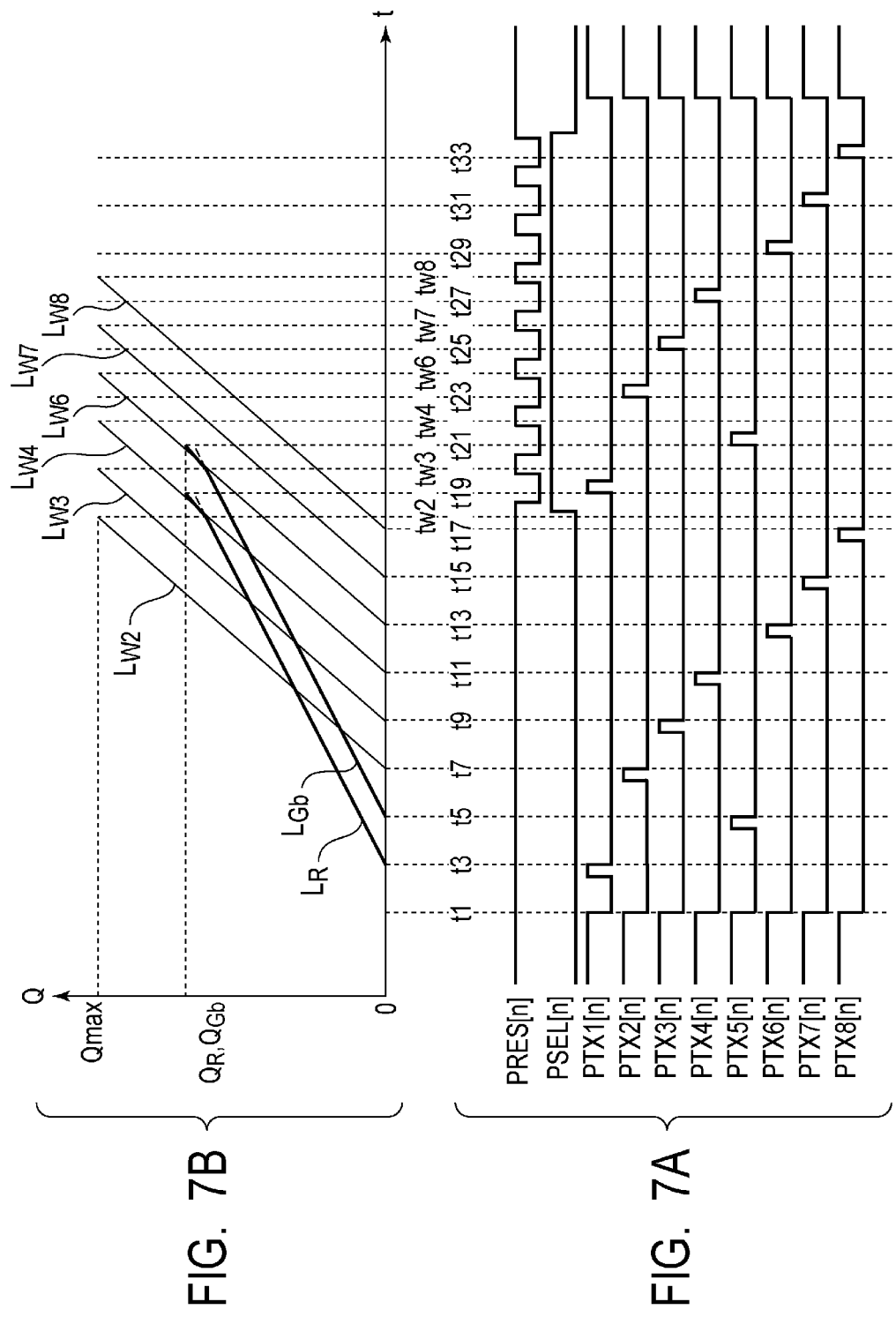
FIG. 7A is a timing chart of a control signal supplied to the pixel according to the first embodiment.
FIG. 7B is a graph illustrating an amount of charges accumulated in a photoelectric conversion unit according to the first embodiment.

FIG. 7A is a timing chart of a control signal supplied to the pixel according to the present embodiment. FIG. 7A illustrates timings of the control signals PRES[n], PSEL[n], and PTX1[n] to PTX8[n] supplied to the pixels in the n-th row in the operation from the start of accumulation to the read operation of the unit pixel P(m, n). FIG. 7B is a graph illustrating an amount of charges accumulated in the photoelectric conversion unit.

In the graph of FIG. 7B, the vertical axis represents the charge amount Q accumulated in each photoelectric conversion unit, and the horizontal axis represents the time t. In FIG. 7B, the time t is illustrated to correspond to the time of the timing chart of FIG. 7A. In the vertical axis, $Q_{max}$ represents the maximum amount of charge that can be accumulated in the photoelectric conversion unit, that is, the amount of charges at the saturated state. In the vertical axis, $Q_R$ and $Q_{Gb}$ represent the amount of charges accumulated in a predetermined accumulation time. A straight line $L_R$ and a straight line $L_{Gb}$ on the graph indicate the accumulation states of charges in the pixel R and the pixel Gb. The straight lines $L_{W2}$, $L_{W3}$, $L_{W4}$, $L_{W6}$, $L_{W7}$, and $L_{W8}$ on the graph indicate the accumulation states of charges in the pixel $W_2$, the pixel $W_3$, the pixel $W_4$, the pixel $W_6$, the pixel $W_7$, and the pixel $W_8$, respectively.

The sensitivity of the pixel W is higher than the sensitivity of the pixel R and the pixel Gb. Therefore, the slopes of the straight lines $L_{W2}$, $L_{W3}$, $L_{W4}$, $L_{W6}$, $L_{W7}$, and $L_{W8}$ on the graph are steeper than the slopes of the straight lines $L_R$ and $L_{Gb}$. Although the slope of the straight line $L_R$ and the slope of the straight line $L_{Gb}$ may be different from each other, the straight line $L_R$ and the straight line $L_{Gb}$ are illustrated with the same slope for simplification in the present embodiment from the viewpoint of clearly illustrating the magnitude relation with respect to the slopes of the straight lines $L_{W2}$, $L_{W3}$, $L_{W4}$, $L_{W6}$, $L_{W7}$, and $L_{W8}$.

Next, the accumulation state of charges in each photoelectric conversion unit will be described with reference to FIGS. 7A and 7B. The reference numerals indicating the times in FIGS. 7A and 7B correspond to the times illustrated in FIG. 5. The operation described in FIG. 5 may be omitted or simplified.

At the time t1, the control signals PTX1[n] to PTX8[n] transition to the low level, and the reset state of each photoelectric conversion unit is released. After the time t1, the control signals PTX1[n] to PTX8[n] sequentially become the high level.

At the time t3, the control signal PTX1[n] transitions to the low level, and charge accumulation is started in the photoelectric conversion unit PD1 (pixel R). As illustrated by the straight line $L_R$ in FIG. 7B, after the time t3, the increase of the charge amount starts in the pixel R.

At the time t5, the control signal PTX5[n] transitions to the low level, and charge accumulation is started in the photoelectric conversion unit PD5 (pixel Gb). As illustrated by the straight line $L_{Gb}$ in FIG. 7B, after the time t5, the increase of the charge amount starts in the pixel Gb.

At the time t7, the control signal PTX2[n] transitions to the low level, and charge accumulation is started in the photoelectric conversion unit PD2 (pixel $W_2$). As illustrated by the straight line $L_{W2}$ in FIG. 7B, after the time t7, the increase of the charge amount starts in the pixel $W_2$.

Similarly, at the times t9, t11, t13, t15, and t17, charge accumulation is started in the photoelectric conversion units PD3 (pixel $W_3$), PD4 (pixel $W_4$), PD6 (pixel $W_6$), PD7 (pixel $W_7$), and PD8 (pixel $W_8$), respectively.

At time tw2, the amount of charges accumulated in the pixel $W_2$ is saturated. That is, in the pixel $W_2$, charges are likely to overflow to other pixels via the floating diffusion FD during a period from the time tw2 to the time t23 at which the read operation is started. Thus, when a certain pixel is saturated, blooming may occur in other pixels sharing the floating diffusion FD. In addition to the floating diffusion FD, there are some paths where charges overflow between photoelectric conversion units. Therefore, the overflowing charges may be likely to flow particularly into the adjacent photoelectric conversion units PD1 (pixel R) and PD4 (pixel $W_4$). Therefore, blooming may occur significantly in pixels adjacent to the pixels in the saturated state.

At the time t19, the control signal PTX1[n] transitions to the high level, and the charges $Q_R$ accumulated in the photoelectric conversion unit PD1 (pixel R) is transferred to the floating diffusion FD and read out.

Since the pixel $W_2$ is in the saturated state during a period from the time tw2 to the time tw19 at which reading of the photoelectric conversion unit PD1 (pixel R) is started, the pixel $W_2$ may cause blooming in other pixels. In particular, blooming may occur significantly in the adjacent photoelectric conversion units PD1 (pixel R). That is, the slope of the straight line $L_R$ of the photoelectric conversion unit PD1 (pixel R) can change according to the amount of charge flowing from the photoelectric conversion unit PD1 (pixel $W_2$).

At time tw3, the amount of charge accumulated in the pixel $W_3$ is saturated. That is, in the pixel $W_3$, charges are likely to overflow to other photoelectric conversion units via the floating diffusion FD during a period from the time tw3 to the time t25 at which the read operation is started. In addition, the overflowing charges are likely to flow particularly into the adjacent photoelectric conversion units PD5 (pixel Gb) and PD4 (pixel $W_4$). However, in the photoelectric conversion unit PD1 (pixel R) adjacent to the photoelectric conversion unit PD3 (pixel $W_3$), the read operation has already been completed at the time t19. Therefore, the photoelectric conversion unit PD1 (pixel R) is not affected by charges overflowed from the photoelectric conversion unit PD3 (pixel $W_3$).

At the time t21, the control signal PTX5[*n*] transitions to the high level, and the charges $Q_{Gb}$ accumulated in the photoelectric conversion unit PD5 (pixel Gb) is transferred to the floating diffusion FD and read out.

Meanwhile, during a period from the time tw3 to the time tw21 at which reading of the photoelectric conversion unit PD5 (pixel Gb) is started, since the pixel $W_3$ is in the saturated state, it may cause blooming in other pixels. In particular, blooming may occur significantly in the adjacent photoelectric conversion units PD5 (pixel Gb). That is, the slope of the straight line $L_{Gb}$ of the photoelectric conversion unit PD5 (pixel Gb) changes according to the amount of charges flowing from the photoelectric conversion unit PD3 (pixel $W_3$), and the charge amount of the photoelectric conversion unit PD5 becomes the pixel Gb charge amount $Q_{Gb}$.

Thereafter, in a period from time tw4 to time tw8, the photoelectric conversion units PD4 (pixel $W_4$), PD6 (pixel $W_6$), PD7 (pixel $W_7$) and PD8 (pixel $W_8$) are sequentially saturated. As a result, these photoelectric conversion units are in a state in which charges are likely to overflow. However, at this time, the read operation of the photoelectric conversion unit PD1 (pixel R) and the photoelectric conversion unit PD5 (pixel Gb) has already been completed. Therefore, the photoelectric conversion unit PD1 (pixel R) and the photoelectric conversion unit PD5 (pixel Gb) are not affected by charges overflowed from these pixels W.

At the time t23, the control signal PTX2[*n*] transitions to the high level, and the charges $Q_{max}$ accumulated in the photoelectric conversion unit PD2 (pixel $W_2$) is transferred to the floating diffusion FD and read out.

Similarly, at the times t25, t27, t29, t31, and t33, charges $Q_{max}$ accumulated in the photoelectric conversion units PD3 (pixel $W_3$), PD4 (pixel $W_4$), PD6 (pixel $W_6$), PD7 (pixel $W_7$), and PD8 (pixel $W_8$) are read out. In this manner, a series of operations from the start of accumulation to the reading operation in the unit pixel P(m, n) is completed.

As described above, in the present embodiment, the unit pixel P(m, n) includes the pixel W (the photoelectric conversion unit of the first group) with high sensitivity and the pixel R and the pixel Gb (the photoelectric conversion units of the second group) with lower sensitivity than the pixel W. At this time, charge accumulation in the pixel R and the pixel Gb with low sensitivity is started before the pixel W, and reading in the pixel R and the pixel Gb is performed before the pixel W. Thereby, it is possible to shorten a period in which the pixel R and the pixel Gb are affected by the pixel W that is saturated and causes the charge overflow. Therefore, according to the present embodiment, a photoelectric conversion device capable of reducing blooming is provided.

Second Embodiment

A photoelectric conversion device according to the present embodiment will be described with reference to FIGS. 8, 9, and 10, focusing on differences from the first embodiment. The description of the same portions as those of the first embodiment may be omitted or simplified.

In the first embodiment, by appropriately setting the connection relationship of the wirings between the vertical scanning unit 3 and the pixel array 4, the reading order of the photoelectric conversion units in the unit pixels P(m, n) is set. On the other hand, the present embodiment is different from the first embodiment in that the control unit 2 stores reading order, and the order of the control signals TX1 to TX8 output from the vertical scanning unit 3 is electrically switched according to the stored reading order.

Figure 8:
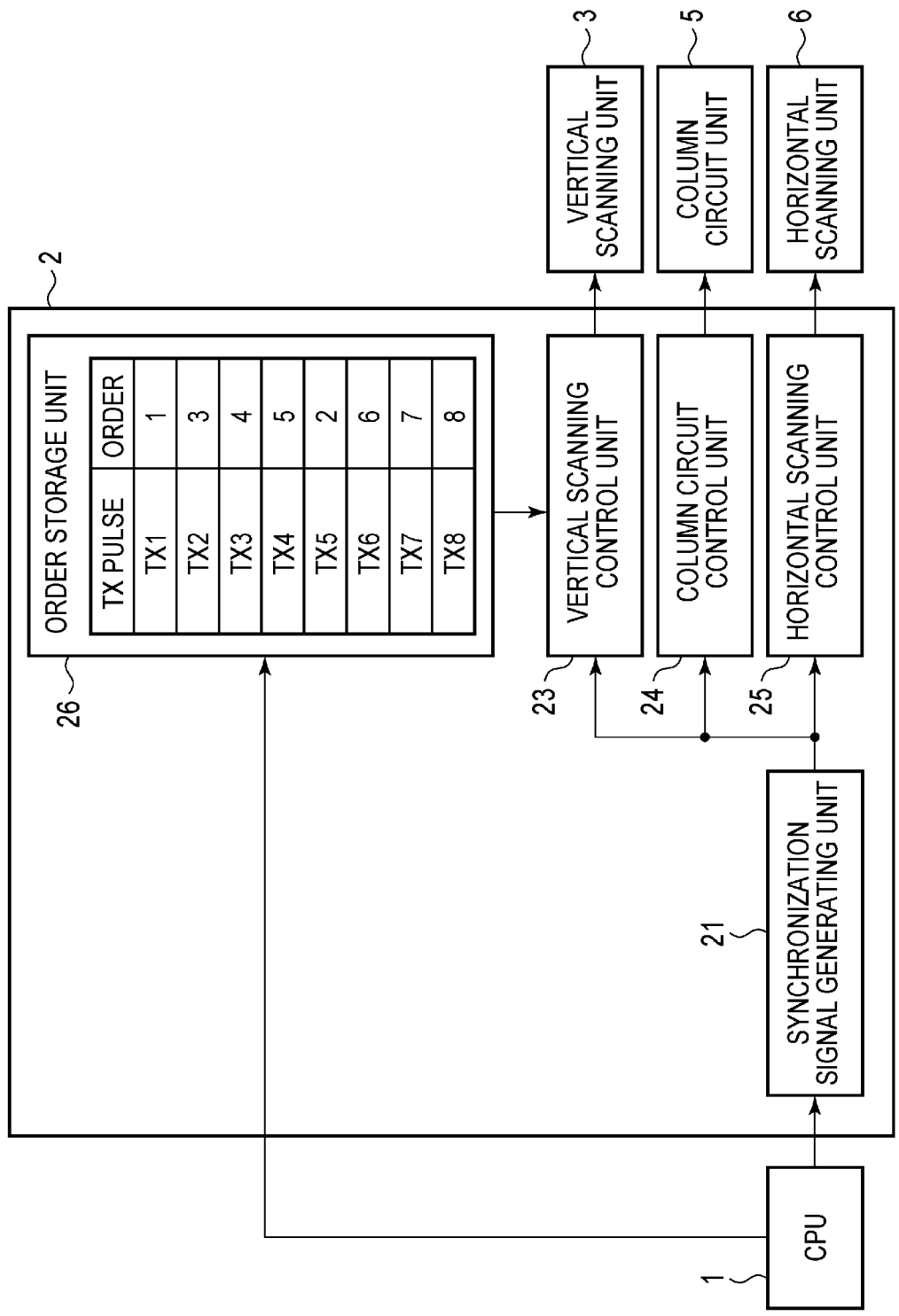
FIG. 8 is a block diagram illustrating a configuration of a control unit according to a second embodiment.

FIG. 8 is a block diagram illustrating a configuration of the control unit 2 according to the present embodiment. The control unit 2 further includes an order storage unit 26. The order storage unit 26 stores a driving order of the control signals TX1 to TX8. This driving order can be rewritten under the control of the CPU 1. As illustrated in FIG. 8, the order storage unit 26 of the present embodiment stores the driving order so as to drive the control signals TX1 to TX8 in the order of TX1, TX5, TX2, TX3, TX4, TX6, TX7, and TX8. The vertical scanning control unit 23 controls the timings of the control signals TX1 to TX8 according to the order stored in the order storage unit 26, and outputs the control signals TX1 to TX8 to the vertical scanning unit 3.

Next, the pixel driving pulse output from the vertical scanning unit 3 will be described with reference to FIG. 9. FIG. 9 is a timing chart of a control signal output from the vertical scanning unit 3 according to the present embodiment.

Figure 9:
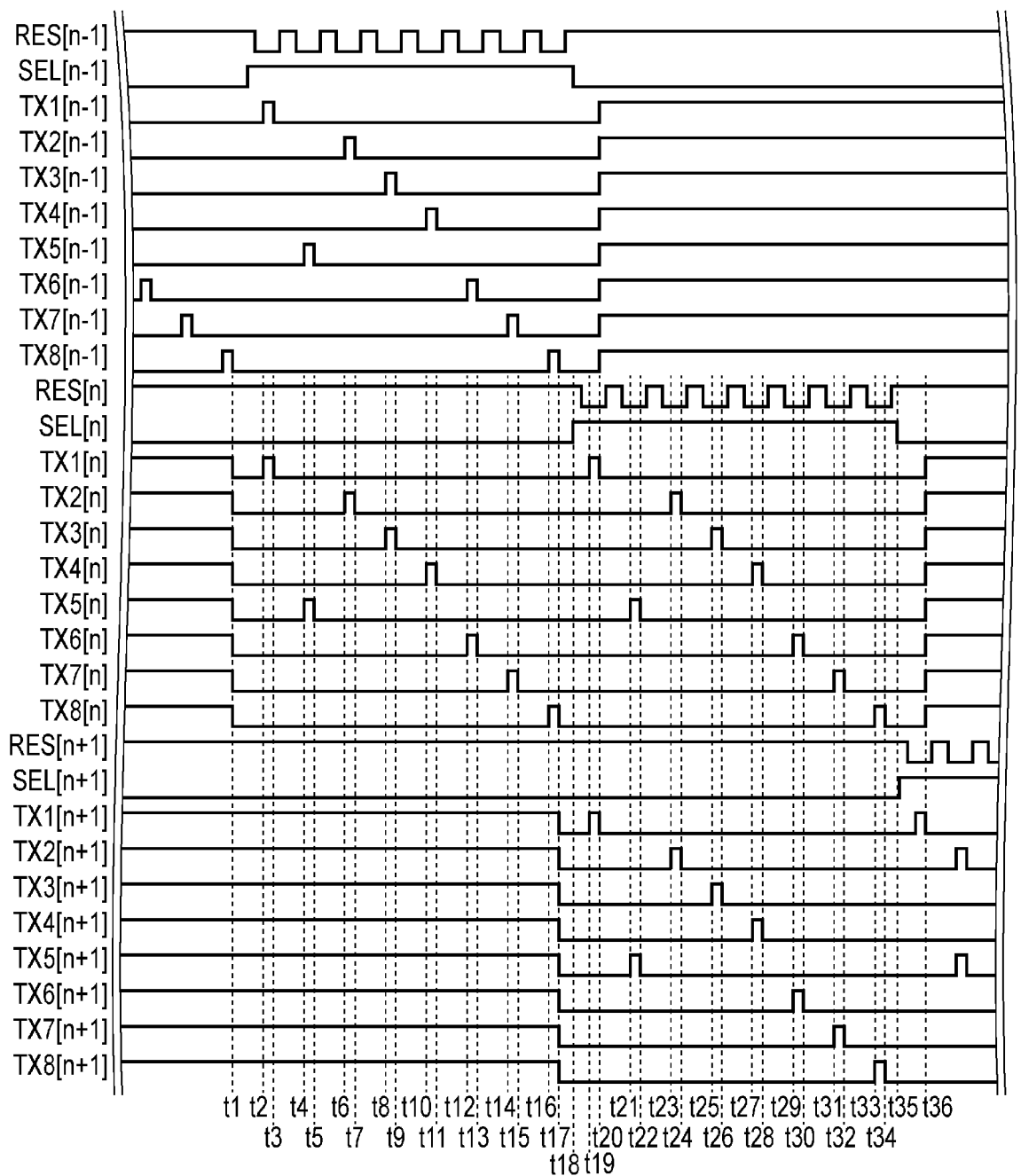
FIG. 9 is a timing chart of a control signal output from a vertical scanning unit according to the second embodiment.

FIG. 9 is a timing chart of pixel driving pulses in the (n−1)-th to (n+1)-th rows corresponding to the unit pixels P output from the vertical scanning unit 3. The difference between FIG. 9 and FIG. 5 is that the order in which the pulses of the control signals TX1 to TX8 rise is different between the reset scanning from the time t2 to the time t17 and the read scanning from the time t19 to the time 34. In FIG. 9, pulses of the control signals TX1[*n*] to TX8[*n*] rise in the order of TX1[*n*], TX5[*n*], TX2[*n*], TX3[*n*], TX4[*n*], TX6[*n*], TX7[*n*], and TX8[*n*] according to the driving order stored in the order storage unit 26. Since the other points are substantially the same as those in FIG. 5, the description thereof will be omitted.

Next, a connection relationship between the vertical scanning unit 3 and the pixel array 4 in the present embodiment will be described with reference to FIG. 10. FIG. 10 is a schematic diagram illustrating a connection between the vertical scanning unit 3 and the pixel array 4 according to the present embodiment. The reference numerals of the control terminals and the output terminals illustrated in FIG. 10 are the same as those in FIG. 6.

The output terminal RES[n] of the vertical scanning unit 3 is connected to the input terminal PRES[n] of the pixel array 4. The output terminal SEL[n] of the vertical scanning unit 3 is connected to the input terminal PSEL[n] of the pixel array 4. The output terminals TX1[*n*] to TX8[*n*] of the vertical scanning unit 3 are connected to the input terminals PTX1[*n*] to PTX8[*n*] of the pixel array 4, respectively.

Figure 10:
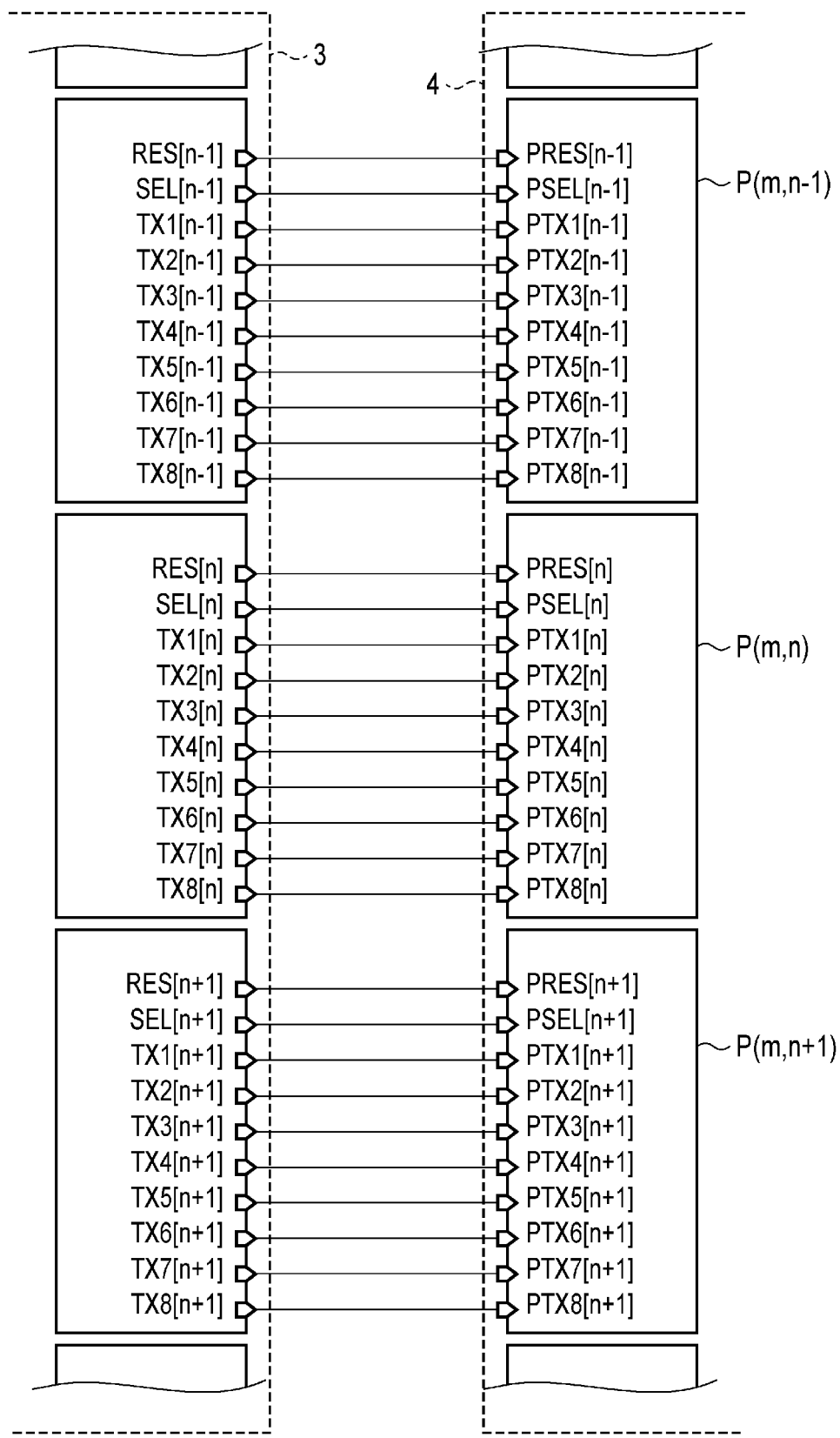
FIG. 10 is a schematic diagram illustrating connections between a vertical scanning unit and a pixel array according to the second embodiment.

As can be understood from FIGS. 9 and 10, the timings of the control signals PRES[n], PSEL[n], and PTX1[*n*] to PTX8[*n*] supplied to the unit pixels P(m, n) are the same as those of the first embodiment illustrated in FIG. 7A. Therefore, also in the present embodiment, a photoelectric conversion device capable of reducing blooming is provided for the same reason as described in the first embodiment with reference to FIG. 7B.

Further, in the present embodiment, when the design change such as the arrangement of the color filters is performed, by rewriting the driving order stored in the order storage unit 26 from the CPU 1, the reading order can be changed without changing the circuit in the photoelectric conversion device. Therefore, the degree of freedom of design change can be improved as compared with the configuration of the first embodiment.

Third Embodiment

A photoelectric conversion device according to the present embodiment will be described with reference to FIGS. 11, 12, 13, 14A, and 14B, focusing on differences from the first embodiment or the second embodiment. The description of the same portions as those of the first embodiment or the second embodiment may be omitted or simplified.

In the first embodiment and the second embodiment, the pixel arrangement RGBW12 is applied to the arrangement of the color filters in the pixel array 4. On the other hand, the present embodiment is different from the first embodiment and the second embodiment in that a so-called Bayer arrangement is applied to the pixel array 4.

Figure 11:
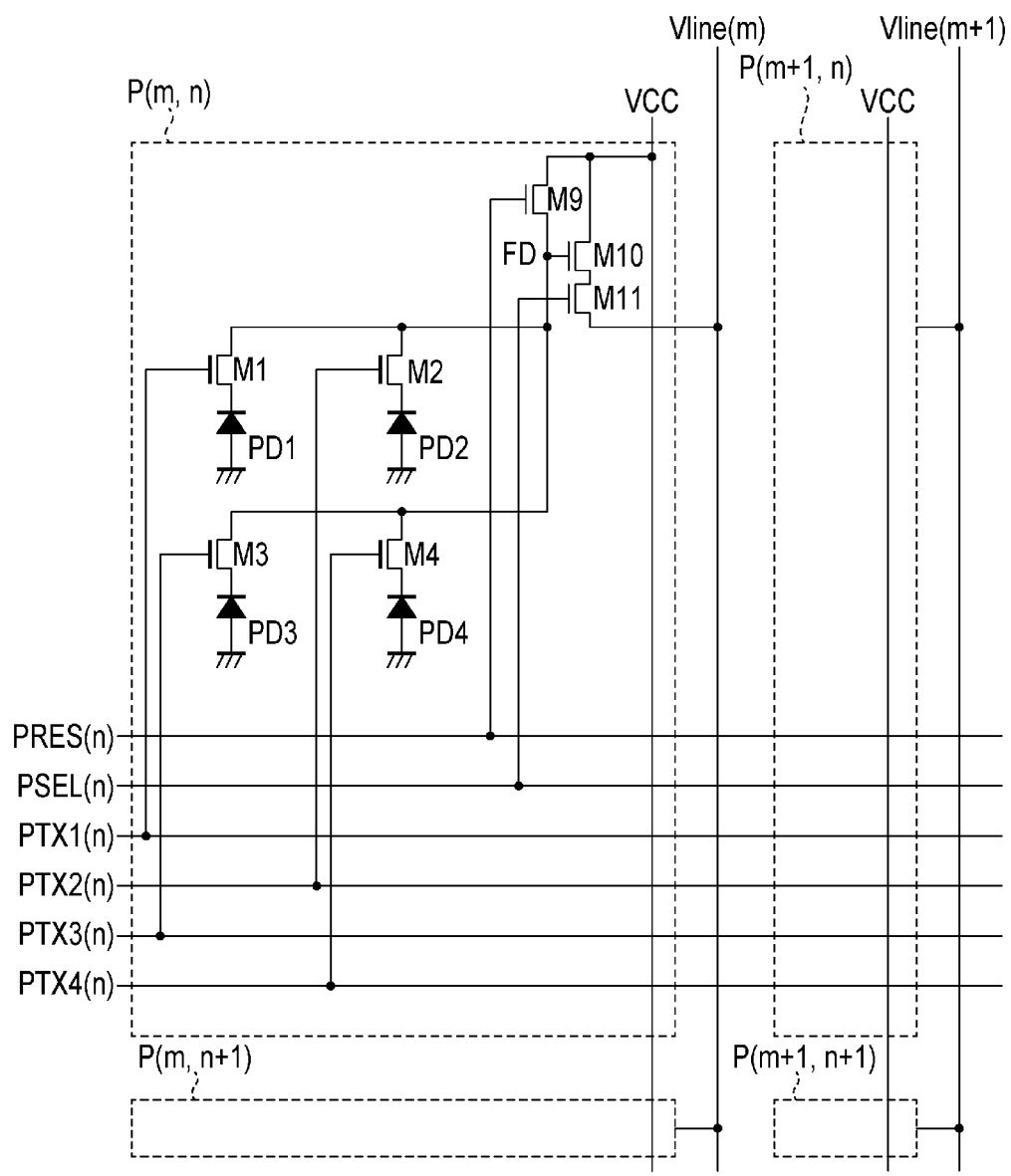
FIG. 11 is a circuit diagram of a unit pixel according to a third embodiment.

FIG. 11 is a circuit diagram of the unit pixels P included in the pixel array 4 according to the present embodiment. FIG. 11 schematically illustrates the unit pixels P on the two rows and two columns of the n-th row and the (n+1)-th row and the m-th column and the (m+1)-th column. In FIG. 11, the unit pixel P(m, n) is arranged at the n-th row and m-th column of the pixel array 4. Each unit pixel P includes photoelectric conversion units PD1 to PD4, a floating diffusion FD, transfer transistors M1 to M4, a reset transistor M9, an amplification transistor M10, and a selection transistor M11. The unit pixel P is an FD sharing pixel in which four photoelectric conversion units PD1 to PD4 share one floating diffusion FD. As described above, since the circuit configuration is the same as the first embodiment except that the number of photoelectric conversion units and transfer transistors included in one unit pixel P is different, the description of functions and the like of each element is omitted.

Figure 12:
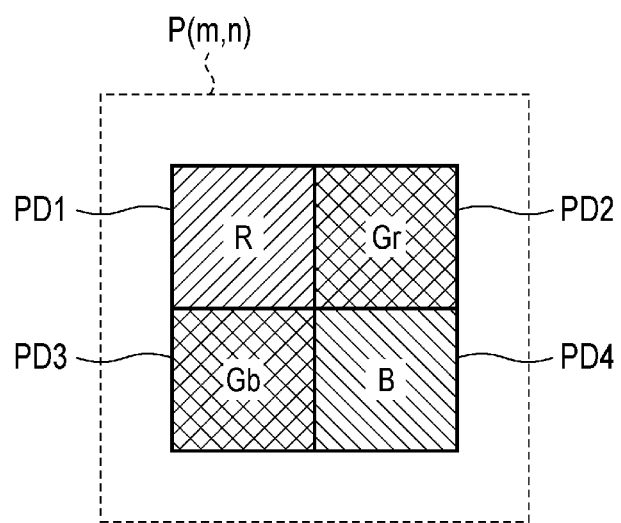
FIG. 12 is a schematic diagram illustrating an arrangement of color filters according to the third embodiment.

Next, the arrangement of color filters in the unit pixel P according to the present embodiment will be described with reference to FIG. 12. FIG. 12 is a layout diagram of color filters of the unit pixel P according to the present embodiment. The red (R) color filter is disposed on the photoelectric conversion unit PD1. The photoelectric conversion unit PD1 may be referred to as a pixel R. The green (G) color filters are disposed on the photoelectric conversion units PD2 and PD3. The photoelectric conversion unit PD2 may be referred to as a pixel G (pixel Gr). The photoelectric conversion unit PD3 may be referred to as a pixel G (pixel Gb). The blue (B) color filter is disposed on the photoelectric conversion unit PD4. The photoelectric conversion unit PD4 is may be referred to as a pixel B. These color filters form a so-called Bayer arrangement.

The sensitivity of the pixel Gr and the pixel Gb is higher than the sensitivity of the pixel R and the pixel B due to the wavelength dependency of the sensitivity or the like. In the present embodiment, the reset scanning and the read scanning of each pixel are performed in the order in which the above-described sensitivity difference is considered in the Bayer array. Hereinafter, the reset scanning and the read scanning of the present embodiment will be described.

Figure 13:
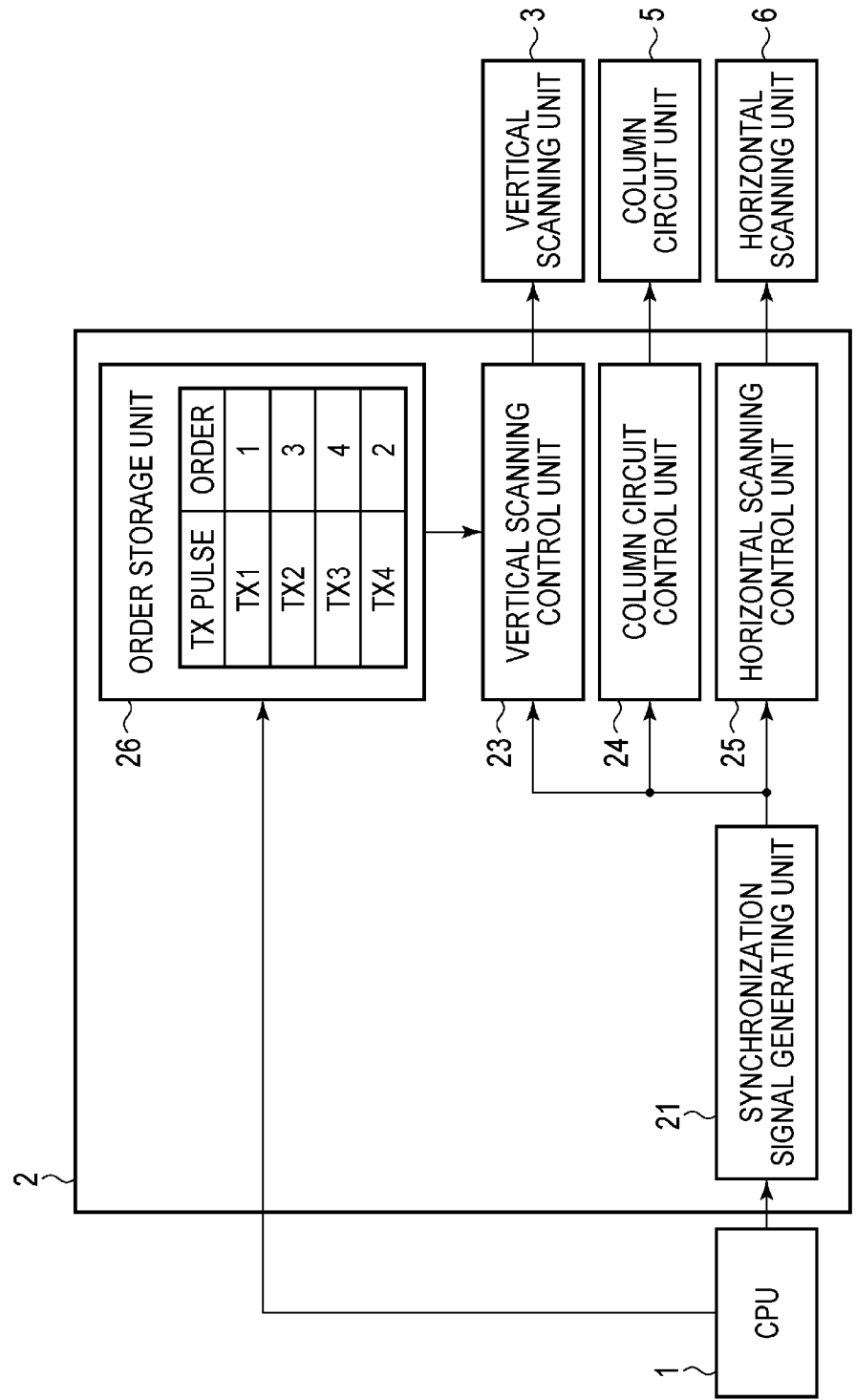
FIG. 13 is a block diagram illustrating a configuration of a control unit according to the third embodiment.

FIG. 13 is a block diagram illustrating a configuration of the control unit 2 according to the present embodiment. As in the second embodiment, the control unit 2 includes the order storage unit 26. As illustrated in FIG. 13, the order storage unit 26 in this embodiment stores the driving order so as to drive the control signals TX1 to TX4 in the order of TX1, TX4, TX2, and TX3. The vertical scanning control unit 23 controls the timings of the control signals TX1 to TX4 according to the order stored in the order storage unit 26, and outputs the control signals TX1 to TX4 to the vertical scanning unit 3.

In this embodiment, the connection relationship between the vertical scanning unit 3 and the pixel array 4 is substantially the same as that in the second embodiment. The output terminal RES[n] of the vertical scanning unit 3 is connected to the input terminal PRES[n] of the pixel array 4. The output terminal SEL[n] of the vertical scanning unit 3 is connected to the input terminal PSEL[n] of the pixel array 4. The output terminals TX1[$n$] to TX4[$n$] of the vertical scanning unit 3 are connected to the input terminals PTX1[$n$] to PTX4[$n$] of the pixel array 4, respectively. That is, the connection relationship of the present embodiment corresponds to the case where the output terminals TX5 to TX8 of the vertical scanning unit 3 and the input terminals PTX5 to PTX8 of the pixel array 4 are omitted from FIG. 10 of the second embodiment.

Figure 14B:
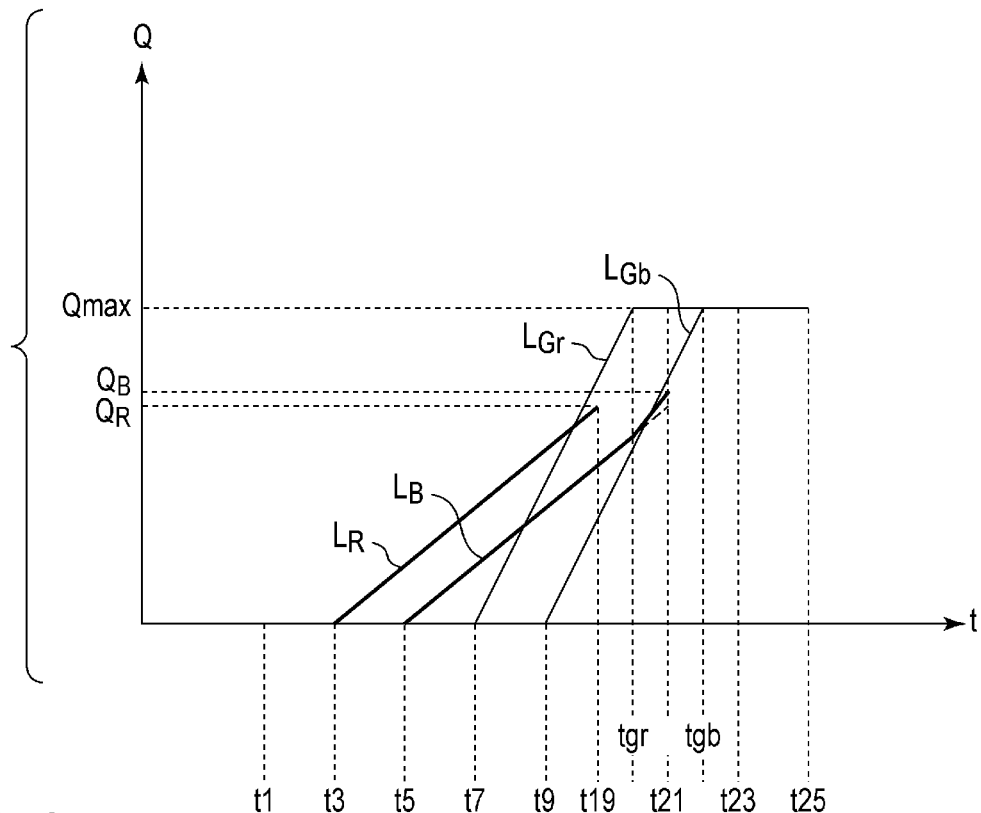
FIG. 14B is a graph illustrating an amount of charges accumulated in the photoelectric conversion unit according to the third embodiment.
Figure 14A:
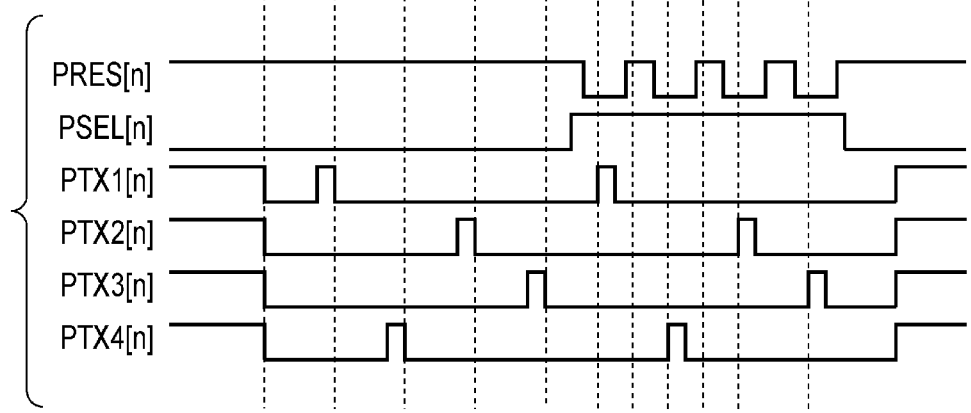
FIG. 14A is a timing chart of a control signal supplied to the pixel according to the third embodiment.

FIG. 14A is a timing chart of a control signal supplied to the pixel according to the present embodiment. FIG. 14A illustrates timings of the control signals PRES[n], PSEL[n], and PTX1[$n$] to PTX4[$n$] supplied to the pixels in the n-th row in the operation from the start of accumulation to the read operation of the unit pixel P(m, n). FIG. 14B is a graph illustrating an amount of charges accumulated in the photoelectric conversion unit.

In the graph of FIG. 14B, the vertical axis represents the amount of charge accumulated in each photoelectric conversion unit, and the horizontal axis represents the time t. In FIG. 14B, the time t is illustrated to correspond to the time of the timing chart of FIG. 14A. In the vertical axis, $Q_{max}$ represents the maximum amount of charges that can be accumulated in the photoelectric conversion unit, that is, the amount of charges at the saturated state. In the vertical axis, $Q_R$ and $Q_B$ represent the amount of charges accumulated in a predetermined accumulation time. Further, a straight line $L_R$ and a straight line $L_B$ on the graph indicate the accumulation states of charges in the pixel R and the pixel B, and a straight line $L_{Gr}$ and a straight line $L_{Gb}$ indicate the accumulation states of charges in the pixel Gr and the pixel Gb, respectively.

The sensitivity of the pixel Gr and the pixel Gb is higher than the sensitivity of the pixel R and the pixel B. Therefore, the slopes of the straight lines $L_{Gr}$ and $L_{Gb}$ on the graph are steeper than the slopes of the straight lines $L_R$ and $L_B$. Although the slope of the straight line $L_R$ and the slope of the straight line $L_B$ may be different from each other, the straight line $L_R$ and the straight line $L_B$ are illustrated with the same slope for simplification in the present embodiment from the viewpoint of clearly illustrating the magnitude relation with respect to the slopes of the straight line $L_{Gr}$ and the straight line $L_{Gb}$.

Next, the accumulation state of charges in each photoelectric conversion unit will be described with reference to FIGS. 14A and 14B. The operation described in FIG. 5 may be omitted or simplified.

At the time t1, the control signals PTX1[$n$] to PTX4[$n$] transition to the low level, and the reset state of each photoelectric conversion unit is released. After the time t1, the control signals PTX1[$n$] to PTX4[$n$] are sequentially set to the high level based on the order stored in the order storage unit 26.

At the time t3, the control signal TX1[$n$] transitions to the low level, and charge accumulation is started in the photoelectric conversion unit PD1 (pixel R). As illustrated by the straight line $L_R$ in FIG. 14B, after the time t3, the increase of the charge amount starts in the pixel R.

At the time t5, the control signal PTX4[n] transitions to the low level, and charge accumulation is started in the photoelectric conversion unit PD4 (pixel B). As illustrated by the straight line $L_B$ in FIG. 14B, after the time t5, the increase of the charge amount starts in the pixel B.

At the time t7, the control signal PTX2[n] transitions to the low level, and charge accumulation is started in the photoelectric conversion unit PD2 (pixel Gr). As illustrated by the straight line $L_{Gr}$ in FIG. 14B, after the time t7, the increase of the charge amount starts in the pixel Gr.

At the time t9, the control signal PTX3[n] transitions to the low level, and charge accumulation is started in the photoelectric conversion unit PD3 (pixel Gb). As illustrated by the straight line $L_{Gb}$ in FIG. 14B, after the time t9, the increase of the charge amount starts in the pixel Gb.

At the time t19, the control signal PTX1[n] transitions to the high level, and the charges $Q_R$ accumulated in the photoelectric conversion unit PD1 (pixel R) is transferred to the floating diffusion FD and read out. Since none of the photoelectric conversion units is saturated at the time t19, the photoelectric conversion unit PD1 (pixel R) is not affected by the other photoelectric conversion units.

At time tgr, the amount of charges accumulated in the photoelectric conversion unit PD2 (pixel Gr) is saturated. That is, in the pixel Gr, charges are likely to overflow to other photoelectric conversion units via the floating diffusion FD during a period from the time tgr to the time t23 at which the read operation is started. In addition, the overflowing charges are likely to flow particularly into the adjacent photoelectric conversion units PD1 (pixels R) and PD4 (pixels B). However, in the photoelectric conversion unit PD1 (pixel R), the read operation has already been completed at the time t19. Therefore, the photoelectric conversion unit PD1 (pixel R) is not affected by charges overflowed from the photoelectric conversion unit PD2 (pixel Gr).

Next, at the time t21, the control signal PTX4[n] transitions to the high level, and the charges $Q_B$ accumulated in the photoelectric conversion unit PD4 (the pixel B) is transferred to the floating diffusion FD and read out.

Since the pixel Gr is in the saturated state during a period from the time tgr to the time t21 at which reading of the photoelectric conversion unit PD4 (pixel B) is started, the pixel Gr may cause blooming in other pixels. In particular, blooming may occur significantly in the adjacent photoelectric conversion units PD4 (pixels B). That is, the slope of the straight line $L_B$ of the photoelectric conversion unit PD4 (pixel B) changes according to the amount of charges flowing from the photoelectric conversion unit PD2 (pixel Gr), and the charge amount of the photoelectric conversion unit PD4 becomes the pixel B charge amount $Q_B$.

At time tgb, the amount of charges accumulated in the pixel Gb is saturated. That is, in the pixel Gb, charges are likely to overflow to other photoelectric conversion units via the floating diffusion FD during a period from the time tgb to the time t25 at which the read operation is started. In addition, the overflowing charges are likely to flow particularly to the adjacent photoelectric conversion unit PD1 (pixel R) and photoelectric conversion unit PD4 (pixel B). However, the read operation has already been completed in the photoelectric conversion unit PD1 (pixel R) and the photoelectric conversion unit PD4 (pixel B) adjacent to the pixel Gb. Therefore, the photoelectric conversion unit PD1 (pixel R) and the photoelectric conversion unit PD4 (pixel B) are not affected by charges overflowed from the pixel Gb.

At the time t23, the control signal PTX2[n] transitions to the high level, and the charge $Q_{max}$ accumulated in the photoelectric conversion unit PD2 (pixel Gr) is transferred to the floating diffusion FD and read out.

At the time t25, the control signal PTX3[n] transitions to the high level, and the charge $Q_{max}$ accumulated in the photoelectric conversion unit PD3 (pixel Gb) is transferred to the floating diffusion FD and read out. In this manner, a series of operations from the start of accumulation to the reading operation in the unit pixel P(m, n) is completed.

As described above, in the present embodiment, the unit pixel P(m, n) forms the Bayer arrangement. That is, the unit pixel P(m, n) includes the pixel G (the photoelectric conversion unit of the first group) with high sensitivity and the pixel R and the pixel B (the photoelectric conversion units of the second group) with lower sensitivity than the pixel G. At this time, accumulation of charges in the pixel R and the pixel B with low sensitivity is started before the pixel G, and reading in the pixel R and the pixel B is performed before the pixel G. Thereby, it is possible to shorten a period in which the pixel R and the pixel B are affected by the pixel G that is saturated and causes the charge overflow. Therefore, according to the present embodiment, a photoelectric conversion device capable of reducing blooming is provided.

Fourth Embodiment

Figure 15:
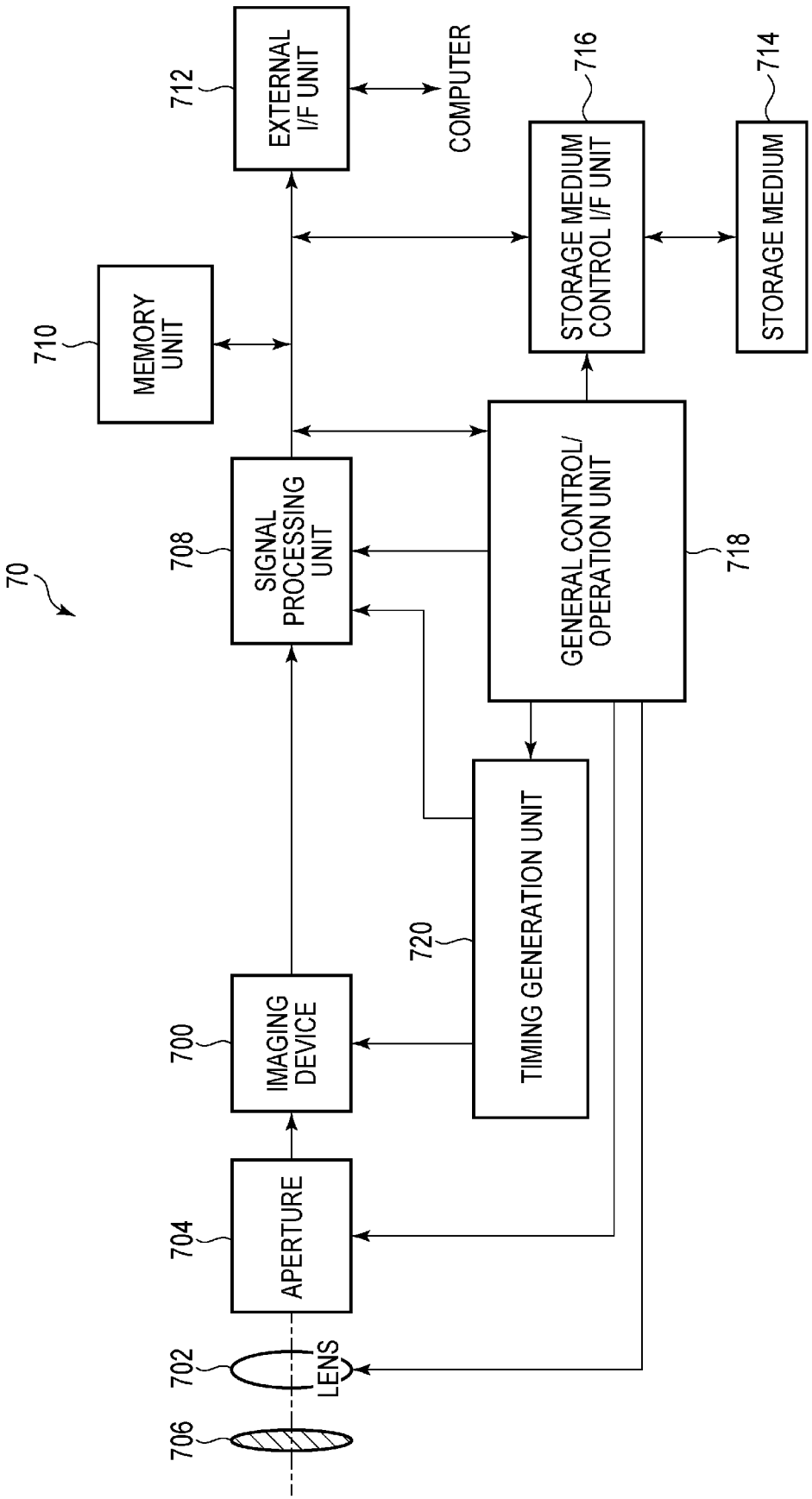
FIG. 15 is a block diagram of equipment according to a fourth embodiment.

The photoelectric conversion device of the above embodiment can be applied to various equipment. Examples of the equipment include a digital still camera, a digital camcorder, a camera head, a copying machine, a facsimile, a mobile phone, a vehicle-mounted camera, an observation satellite, and a surveillance camera. FIG. 15 is a block diagram of a digital still camera as an example of equipment.

The equipment 70 illustrated in FIG. 15 includes a barrier 706, a lens 702, an aperture 704, and an imaging device 700 (an example of the photoelectric conversion device). The equipment 70 further includes a signal processing unit (processing device) 708, a timing generation unit 720, a general control/operation unit 718 (control device), a memory unit 710 (storage device), a storage medium control I/F unit 716, a storage medium 714, and an external I/F unit 712. At least one of the barrier 706, the lens 702, and the aperture 704 is an optical device corresponding to the equipment. The barrier 706 protects the lens 702, and the lens 702 forms an optical image of an object on the imaging device 700. The aperture 704 varies the amount of light passing through the lens 702. The imaging device 700 is configured as in the above embodiment, and converts an optical image formed by the lens 702 into image data (image signal). The signal processing unit 708 performs various corrections, data compression, and the like on the imaging data output from the imaging device 700. The timing generation unit 720 outputs various timing signals to the imaging device 700 and the signal processing unit 708. The general control/operation unit 718 controls the entire digital still camera, and the memory unit 710 temporarily stores image data. The storage medium control I/F unit 716 is an interface for storing or reading image data on the storage medium 714, and the storage medium 714 is a detachable storage medium such as a semiconductor memory for storing or reading captured image data. The external I/F unit 712 is an interface for communicating with an external computer or the like. The timing signal or the like may be input from the outside of the equipment. The equipment 70 may further include a display device (a monitor, an electronic view finder, or the like) for displaying information obtained by the photoelectric conversion device. The equipment includes at least a photoelectric conversion device. Further, the equipment 70 includes at least one of an optical device, a control device, a processing device, a display device, a storage device, and a mechanical device that operates based on information obtained by the photoelectric conversion device. The mechanical device is a movable portion (for example, a robot arm) that receives a signal from the photoelectric conversion device for operation.

Each pixel may include a plurality of photoelectric conversion units (a first photoelectric conversion unit and a second photoelectric conversion unit). The signal processing unit 708 may be configured to process a pixel signal based on charges generated in the first photoelectric conversion unit and a pixel signal based on charges generated in the second photoelectric conversion unit, and acquire distance information from the imaging device 700 to an object.

Fifth Embodiment

Figure 16A:
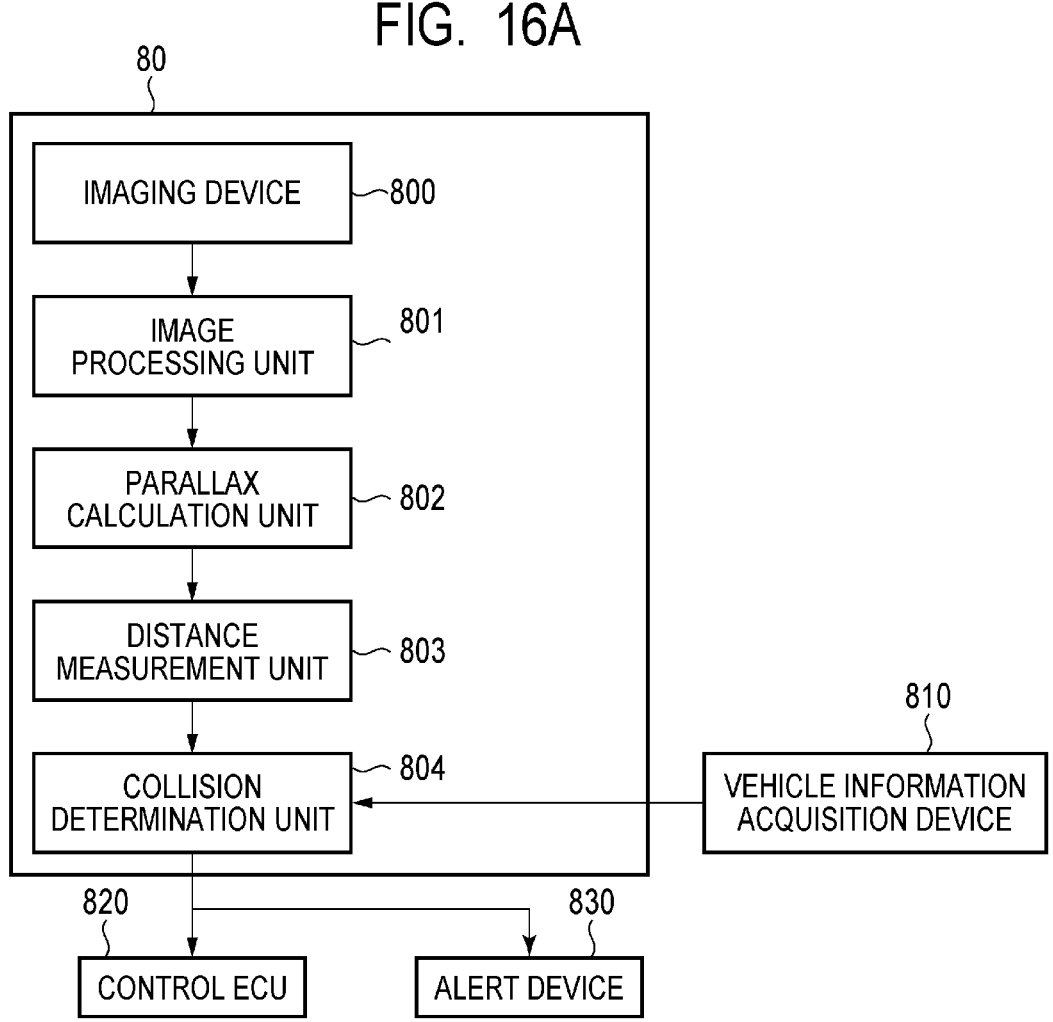
FIGS. 16A and 16B are block diagrams of equipment according to a fifth embodiment.
Figure 16B:
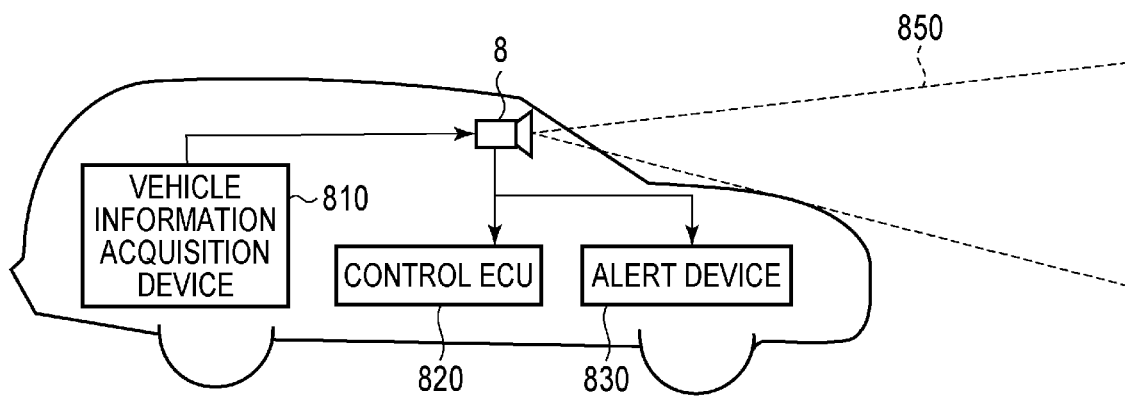

FIGS. 16A and 16B are block diagrams of equipment relating to the vehicle-mounted camera according to the present embodiment. The equipment 80 includes an imaging device 800 (an example of the photoelectric conversion device) of the above-described embodiment and a signal processing device (processing device) that processes a signal from the imaging device 800. The equipment 80 includes an image processing unit 801 that performs image processing on a plurality of pieces of image data acquired by the imaging device 800, and a parallax calculation unit 802 that calculates parallax (phase difference of parallax images) from the plurality of pieces of image data acquired by the equipment 80. The equipment 80 includes a distance measurement unit 803 that calculates a distance to an object based on the calculated parallax, and a collision determination unit 804 that determines whether or not there is a possibility of collision based on the calculated distance. Here, the parallax calculation unit 802 and the distance measurement unit 803 are examples of a distance information acquisition unit that acquires distance information to the object. That is, the distance information is information on a parallax, a defocus amount, a distance to the object, and the like. The collision determination unit 804 may determine the possibility of collision using any of these pieces of distance information. The distance information acquisition unit may be realized by dedicatedly designed hardware or software modules. Further, it may be realized by a field programmable gate array (FPGA), an application specific integrated circuit (ASIC) or a combination thereof.

The equipment 80 is connected to the vehicle information acquisition device 810, and can obtain vehicle information such as a vehicle speed, a yaw rate, and a steering angle. Further, the equipment 80 is connected to a control ECU 820 which is a control device that outputs a control signal for generating a braking force to the vehicle based on the determination result of the collision determination unit 804. The equipment 80 is also connected to an alert device 830 that issues an alert to the driver based on the determination result of the collision determination unit 804. For example, when the collision possibility is high as the determination result of the collision determination unit 804, the control ECU 820 performs vehicle control to avoid collision or reduce damage by braking, returning an accelerator, suppressing engine output, or the like. The alert device 830 alerts the user by sounding an alarm such as a sound, displaying alert information on a screen of a car navigation system or the like, or giving vibration to a seat belt or a steering wheel. The equipment 80 functions as a control unit that controls the operation of controlling the vehicle as described above.

In the present embodiment, an image of the periphery of the vehicle, for example, the front or the rear is captured by the equipment 80. FIG. 16B illustrates equipment in a case where an image is captured in front of the vehicle (image capturing range 850). The vehicle information acquisition device 810 as the imaging control unit sends an instruction to the equipment 80 or the imaging device 800 to perform the imaging operation. With such a configuration, the accuracy of distance measurement can be further improved.

Although the example of control for avoiding a collision to another vehicle has been described above, the embodiment is applicable to automatic driving control for following another vehicle, automatic driving control for not going out of a traffic lane, or the like. Furthermore, the equipment is not limited to a vehicle such as an automobile and can be applied to a movable body (movable apparatus) such as a ship, an airplane, a satellite, an industrial robot and a consumer use robot, or the like, for example. In addition, the equipment can be widely applied to equipment which utilizes object recognition or biometric authentication, such as an intelligent transportation system (ITS), a surveillance system, or the like without being limited to movable bodies.

Modified Embodiments

The present invention is not limited to the above embodiment, and various modifications are possible. For example, an example in which some of the configurations of any of the embodiments are added to other embodiments or an example in which some of the configurations of any of the embodiments are replaced with some of the configurations of other embodiments is also an embodiment of the present invention.

In the first embodiment, the eight photoelectric conversion units in the unit pixel P(m, n) share one floating diffusion FD. In the third embodiment, the four photoelectric conversion units in the unit pixel P(m, n) share one floating diffusion FD. However, the number of photoelectric conversion units sharing the floating diffusion FD in the unit pixel P(m, n) is not limited thereto. The number of photoelectric conversion units sharing the floating diffusion FD may be four or more.

The disclosure of this specification includes a complementary set of the concepts described in this specification. That is, for example, if a description of "A is B" (A=B) is provided in this specification, this specification is intended to disclose or suggest that "A is not B" even if a description of "A is not B" (A≠B) is omitted. This is because it is assumed that "A is not B" is considered when "A is B" is described.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-149169, filed Sep. 14, 2021, which is hereby incorporated by reference herein in its entirety.

What is claimed is:

1. A photoelectric conversion device comprising a plurality of unit pixels, each of the plurality of unit pixels including:
    four or more photoelectric conversion units each configured to generate charges corresponding to incident light;
    a charge holding portion to which charges are transferred from the four or more photoelectric conversion units;
    charge transfer units arranged corresponding to the four or more photoelectric conversion units and each configured to transfer charges from corresponding photoelectric conversion unit to the charge holding portion; and
    an output unit configured to output a signal corresponding to charges held by the charge holding portion,
    wherein the four or more photoelectric conversion units are divided into a first group including a plurality of photoelectric conversion units and a second group including a plurality of photoelectric conversion units,
    wherein sensitivity of each photoelectric conversion unit of the first group to the incident light is greater than sensitivity of each photoelectric conversion unit of the second group to the incident light,
    wherein after charge accumulation is started in all the photoelectric conversion units of the second group, charge accumulation is started in the photoelectric conversion units of the first group, and
    wherein after signals corresponding to charges accumulated in all the photoelectric conversion units of the second group are read out, signals corresponding to charges accumulated in the photoelectric conversion units of the first group are read out.

2. The photoelectric conversion device according to claim 1 further comprising a storage unit configured to store information indicating an order of transferring charges at the charge transfer units,
    wherein the charge transfer units are controlled by control signals based on the information stored in the storage unit.

3. The photoelectric conversion device according to claim 1,
    wherein the first group includes a plurality of photoelectric conversion units each configured to generate charges corresponding to white incident light, and
    wherein the second group includes two or more of a photoelectric conversion unit configured to generate charges corresponding to red incident light, a photoelectric conversion unit configured to generate charges corresponding to green incident light, and a photoelectric conversion unit configured to generate charges corresponding to blue incident light.

4. The photoelectric conversion device according to claim 3,
    wherein the first group includes six photoelectric conversion units each configured to generate charges corresponding to white incident light, and
    wherein the second group includes two of a photoelectric conversion unit configured to generate charges corresponding to red incident light, a photoelectric conversion unit configured to generate charges corresponding to green incident light, and a photoelectric conversion unit configured to generate charges corresponding to blue incident light.

5. The photoelectric conversion device according to claim 3,
    wherein the plurality of unit pixels includes a first unit pixel and a second unit pixel,
    wherein the first group of the first unit pixel includes six photoelectric conversion units each configured to generate charges corresponding to white incident light,
    wherein the second group of the first unit pixel includes a photoelectric conversion unit configured to generate charges corresponding to red incident light and a photoelectric conversion unit configured to generate charges corresponding to green incident light,
    wherein the first group of the second unit pixel includes six photoelectric conversion units each configured to generate charges corresponding to white incident light, and
    wherein the second group of the second unit pixel includes a photoelectric conversion unit configured to generate charges corresponding to green incident light and a photoelectric conversion unit configured to generate charges corresponding to blue incident light.

6. The photoelectric conversion device according to claim 1,
    wherein the first group includes a plurality of photoelectric conversion units each configured to generate charges corresponding to green incident light, and
    wherein the second group includes a photoelectric conversion unit configured to generate charges corresponding to red incident light and a photoelectric conversion unit configured to generate charges corresponding to blue incident light.

7. The photoelectric conversion device according to claim 6,
    wherein the first group includes two photoelectric conversion units each configured to generate charges corresponding to green incident light, and
    wherein the second group includes a single photoelectric conversion unit configured to generate charges corresponding to red incident light and a single photoelectric conversion unit configured to generate charges corresponding to blue incident light.

8. The photoelectric conversion device according to claim 1, wherein the four or more photoelectric conversion units are arranged to form a plurality of rows and a plurality of columns.

9. The photoelectric conversion device according to claim 8, wherein each of the plurality of photoelectric conversion units of the second group is arranged adjacent to at least one of the plurality of photoelectric conversion units of the first group.

10. Equipment comprising:
- the photoelectric conversion device according to claim 1; and
- at least any one of:
- an optical device adapted for the photoelectric conversion device,
- a control device configured to control the photoelectric conversion device,
- a processing device configured to process a signal output from the photoelectric conversion device,
- a display device configured to display information obtained by the photoelectric conversion device,
- a storage device configured to store information obtained by the photoelectric conversion device, and
- a mechanical device configured to operate based on information obtained by the photoelectric conversion device.

11. The equipment according to claim 10, wherein the processing device processes image signals generated by a plurality of photoelectric conversion units, respectively, and acquires distance information on a distance from the photoelectric conversion device to an object.

* * * * *